(12) United States Patent
Murray et al.

(10) Patent No.: US 11,553,720 B2
(45) Date of Patent: Jan. 17, 2023

(54) CITRUS DISEASE CURE FORMULATION AND METHOD OF TREATMENT

(71) Applicant: Pouch Pac Innovations, LLC, Sarasota, FL (US)

(72) Inventors: R. Charles Murray, Sarasota, FL (US); John Harlin, Sarasota, FL (US)

(73) Assignee: POUCH PAC INNOVATIONS, LLC, Sarasota, FL (US)

( * ) Notice: Subject to any disclaimer, the term of this patent is extended or adjusted under 35 U.S.C. 154(b) by 231 days.

(21) Appl. No.: 17/102,893

(22) Filed: Nov. 24, 2020

(65) Prior Publication Data

US 2021/0251243 A1 Aug. 19, 2021

Related U.S. Application Data

(60) Provisional application No. 62/940,324, filed on Nov. 26, 2019.

(51) Int. Cl.
| | | |
|---|---|---|
| *A01N 25/02* | (2006.01) | |
| *A01N 31/02* | (2006.01) | |
| *A01N 35/02* | (2006.01) | |
| *A01N 37/06* | (2006.01) | |
| *A01N 43/82* | (2006.01) | |
| *A01N 59/16* | (2006.01) | |
| *A01N 65/08* | (2009.01) | |
| *A01N 65/24* | (2009.01) | |
| *A01N 65/40* | (2009.01) | |
| *A01N 65/42* | (2009.01) | |

(52) U.S. Cl.
CPC ............. *A01N 65/42* (2013.01); *A01N 25/02* (2013.01); *A01N 31/02* (2013.01); *A01N 35/02* (2013.01); *A01N 37/06* (2013.01); *A01N 43/82* (2013.01); *A01N 59/16* (2013.01); *A01N 65/08* (2013.01); *A01N 65/24* (2013.01); *A01N 65/40* (2013.01)

(58) Field of Classification Search
None
See application file for complete search history.

(56) References Cited

PUBLICATIONS

Busch, Glossary, A Glossary for Mass Spectrometry, Spectroscopy 16(11), 28-31, 2001. (Year: 2001).*

* cited by examiner

*Primary Examiner* — Alton N Pryor
(74) *Attorney, Agent, or Firm* — Dinsmore & Shohl LLP

(57) ABSTRACT

An anti-bacterial composition for plants including garlic oil; cinnamon oil; *yucca* stem oil; oleic acid; hemp seed oil; and dimethyl sulfoxide.

19 Claims, 28 Drawing Sheets

CITRUS DISEASE CURE FORMULATION AND METHOD OF TREATMENT

CROSS-REFERENCE TO RELATED APPLICATIONS

This application claims the benefit of U.S. Provisional Application 62/940,324 filed on Nov. 26, 2019 which is herein incorporated by reference in its entirety.

FIELD OF THE INVENTION

The invention relates to anti-bacterial compositions for plants and methods of treating diseased plants.

BACKGROUND OF THE INVENTION

Citrus greening disease (also known as Huanglongbing), caused by bacterium Candidatus Liberibacter *asiaticus* (CLas) in the US, is a serious plant disease around the world that is posing an existential threat to citrus industry and has caused tremendous economic damages. Currently there is no cure or effective treatments to this disease.

The root cause of this disease is the phloem sap sucking insect Asian citrus psyllids (*Diaphorina citri*) (jumping plant lice) serving as a vector transmitting the bacterial pathogen. Three Gram-negative bacteria are believed to cause greening disease in various regions: Candidatus Liberibacter *asiaticus* (CLas), Ca. Liberibacter africanus (CLaf), and Ca. Liberibacter americanus (CLam). They are all restricted to phloem tissue in planta. Citrus greening disease in Florida, USA is caused by CLas. Ever since the insect vector Asian citrus psyllid that carried the bacterial pathogen was unknowingly introduced to the US, perhaps in the 1990s, this disease has caused serious damage to Florida's citrus industry and now is threatening other citrus growing states in the US.

In an action analogous to mosquitos, when the psyllids land on a citrus leaf and start to suck the nutritious fluid from the plant, they also regurgitate/introduce the bacterium CLas from their salivary tissues into the vascular tissue phloem of the plant. CLas proliferates inside the phloem and clogs the transportation system for nutrients and photosynthetic products. Over several years, the citrus tree shows stunted growth and yellowing leaves, producing greening and inedible fruits, leading to leaf and branch die out and eventual plant death, among other symptoms of the citrus greening disease. Adult psyllids live up to several months and reproduce up to 10 generations per year. The psyllids feeding on the infected plants become inoculative, and tend to fly to feed on uninfected plants, thereby transmitting the bacteria further. Currently, this vicious cycle perpetuates to such a devastating situation that one should assume that in Florida every citrus tree is infected with CLas and every psyllid likely carries CLas.

For the past decades, tremendous amounts of resources and efforts have been dedicated to study, treatment and management of citrus greening disease. Measures that have been tested include insecticide, reflective mulch repellent, thermotherapy, fertigation and bactericides/antibiotics or viral/RNAi treatments as well as genetic engineering and transgenic approaches. For example, starting April, 2019, citrus growers in Florida and California start to spray antibiotics streptomycin and oxytetracycline as routing treatments for citrus greening, despite lack of convincing evidence of effectiveness.

There is therefore a need in the art for an effective citrus greening disease treatment.

SUMMARY OF THE INVENTION

In one aspect, there is disclosed an anti-bacterial composition for plants comprising: garlic oil; cinnamon oil; *yucca* stem oil; oleic acid; hemp seed oil; and dimethyl sulfoxide.

In another aspect, there is disclosed a method of treating an infected plant comprising the steps of: forming at least one hole in the phloem of the plant; injecting a therapeutic amount of a compound comprising garlic oil; cinnamon oil; *yucca* stem oil; oleic acid; hemp seed oil; and dimethyl sulfoxide; and sealing the at least one hole.

DETAILED DESCRIPTION OF THE PREFERRED EMBODIMENTS

There is disclosed an effective treatment composition herein after Agent G for citrus greening disease that was tested both in the field and in the lab. Agent G is entirely made from plant extracts. Agent G includes the following ingredients: garlic oil 40-50% (Example 1 45% by weight), cinnamon oil 20 to 30% (Example 1 25% by weight), *Yucca* stem oil 3 to 7% (Example 1 5% by weight), oleic acid 10 to 20% (Example 1 15% by weight), hemp seed oil 8 to 12% (Example 1 9.9% by weight) and dimethyl sulfoxide 0.5 to 0.15 (Example 1 0.1% by weight). The weight percentages are based on the total weight of Agent G.

In another aspect, Agent G may include the following ingredients: garlic oil (45% by weight), cinnamon oil (25% by weight), *Yucca* stem oil (5% by weight), oleic acid (11% by weight), hemp seed oil (9.9% by weight), dimethyl sulfoxide (0.1% by weight) and colloidal silver (4% by weight). The ranges are the same as presented above for Example 1 with the change in the amount of oleic acid with a corresponding amount of colloidal silver. The weight percentages are based on the total weight of Agent G.

Injection of this phytolipid-suspending reagent through phloem (bark) of the diseased orange trees resulted in recovery in both growth and fruit production.

Here we report our examinations of the effects of Agent G on greening disease in orange plants (FIG. 1). Our studies show an effective and feasible treatment that potentially could offer immediate benefit to orange growers.

Materials and Methods

Agent G

The formula design was based on the perceived antibacterial effect of four significant compounds known present in the plant extracts: allicin, saponins, flavonoids and cinnamaldehyde.

Phloemic Injection of Agent G

For this study, plants that showed yellow shots, mottled leaves with yellowing veins and several dying and brownish branches were designated "diseased", which was then confirmed by qPCR to contain Candidatus Liberibacter *asiaticus* (CLas) DNA. Plants without these phenotypic symptoms were "healthy", from which qPCR showed undetectable or extremely low level of CLas.

Two-year-old sweet orange trees (*Citrus sinensis*), either healthy or diseased, were transplanted from an orange grove to a growth room and grown at 25° C. under 8 hr of darkness and 16 hr of cool white light of 250 μmol photons $m^2$/s. To inject Agent G, four 5-mm holes were drilled by a 2-mm drill bit at the base of the tree (7 to 8 cm in circumference). Approximately 0.3 mL of Agent G was injected into each hole with a syringe and a 18G1 needle. The holes were sealed with Pruning Seal (Spectracide).

Three to 8-year-old orange trees grown in a plot of an orange grove in Sarasota, Fla., showed symptoms of greening disease. Injections were done to five orange trees, whereas other trees were left untreated.

DNA and RNA Extraction and qPCR Analysis

At least three leaves including petiole were collected from separate positions on each of healthy and diseased trees grown both in the growth room and in the Sarasota grove. Leaflets of each trifoliolate leaf were cut into two halves along the middle vein and used for extraction of DNA and RNA and for scanning electron microscopy. Leaves were ground in liquid N2 to fine powders with mortars and pestles. Genomic DNA was extracted using GenCatch Plant Genomic DNA Miniprep kit (Epoch Life Science, USA) with RNase treatment. RNA was extracted using Total RNA Mini kit (plant) (Geneaid/FroggaBio, USA) with DNase treatment. First-strand cDNA was made using SuperScript IV reverse transcriptase (Invitrogen, USA) and oligo dT and random primers according to manufacturer's instruction.

Quantitative real-time PCR (qPCR) using SYBR Green (Life Technologies, USA) was carried out to examine the presence of CLas DNA. Two orange plant genes, elongation factor 1-α (EF) and cytochrome oxidase, were used as references for ΔCt normalization. Results with EF are reported here. To detect CLas bacteria, four CLas genes were tested: prophage repeat (PR), elongation factor Ts, 16S rDNA and ribosomal protein L12P, whose primers were designed based on known reports. To detect CLas prophage, five phage genes were tested: peroxidase, glutathione peroxidase, tail fiber, holin and endolysin.

qPCR was also performed to measure the relative transcription levels of several CLas and prophage genes, using the constitutively expressed orange plant cytochrome oxidase gene used as the internal reference.

Scanning Electron Microscopic Observation

Orange leaves including petioles were fixed with 2% glutaraldehyde at 24° C. overnight, followed by dehydration with a series of ethanol solutions from 30% to 100%. Then the dehydrated leaves were ground and fractured in liquid nitrogen, and immediately immerged in 100% ethanol. For scanning electron microscopy imaging, samples were critical-point dried, mounted and gold-coated for viewing with Leica EM CPD300 system according to manufacturer's instructions. At least three leaves from each plant, most coupled with qPCR assays, were processed and viewed.

NMR and GC/MS Analysis of Agent G

The 1H and 1H-1H COSY NMR spectra of Agent G were recorded in CD3OD on a Varian UNITY INOVA 500 MHz spectrometer. Chemical shifts (δ) were referenced internally to the residual solvent peak (CD3OD: 1H, δH 3.31 ppm).

The Agent G cocktail was also subjected to Gas Chromatography-Mass Spectroscopy (GC/MS) analysis. The analysis was conducted using a Perkin-Elmer AutoSystem XL gas chromatograph, paired with a Perkin-Elmer TurboMass Gold mass spectrometer. The GC was equipped with an Elite-5 capillary column with helium as carrier gas and a flow rate of 1 μL/min which was used for separation of compounds. The instrument was set to an initial temperature of 70° C., and maintained at this temperature for 5 min. The oven temperature was raised up to 270° C., at the rate of 5° C./min, and maintained for 9 min. Injection port temperature was ensured as 250° C. and Helium flow rate as one ml/min. The ionization voltage was 70 eV. The MS was used to further analyze compounds and was operated in EI mode. Mass spectral scan range was set at 100-500 (m/z). The individual peaks were identified by comparing their mass spectra with the National Institute Standard and Technology mass spectral database (NIST) and then the compounds of MS matching similarity ≥90% were selected as results.

Phloem Loading Rate Measurements by GC/MS

Detached branches of the tree were placed in a solution of Agent G under white light of 250 μmol photons $m^2/s$ at 25° C. for periods of 4 and 8 hrs. Then the stems were cut into segments of 2 cm in length starting at 10 cm and stored at −80° C. The samples were chopped into pieces of ~0.2 cm, and then immediately submerged into 1 mL of hexanes. The samples were then placed into an ultrasonic bath (25° C.) for 1 hr and extracted overnight (24 hr) prior to GC/MS analysis. The sample solutions were injected into the GC/MS with a volume of 5 μL, and analyzed by GC/MS as described above.

Orange Fruit Yield Measurements

Five to eight-year-old orange trees with obvious heavy symptoms of greening disease and significant die back did not produce any edible fruits during 2014-2015 growth season were injected in 2015 with the Agent G. These trees were cared for as normally as for other trees. During 2015-2016 season, plant growth was monitored visually and with photographs. Orange fruits were harvested and weighed.

Statistical Analysis

For qPCR analysis, three replicates for each assay were performed. The differences doe gene dosages or gene expression levels were tested using one way ANOVA coupled with Games-Howell (equal variance not assumed) and the Least Significant Difference (LSD) methods (equal variance assumed) with the corresponding patterns of experimental data. Statistical analysis was performed using SPSS software (ver. 16.0). The significant level was set at $P<0.05$.

Results

Detection of CLas bacteria

We employed qPCR to detect the presence of CLas bacteria in leaves, as qPCR may detect as little as one copy of bacterial DNA in the sample. To mitigate the drawback of uneven CLas distribution throughout the plant, we sampled 3 to 5 leaves from each tree. We tested primers for four previously reported CLas genes all of which worked well and the prophage repeat seemed more sensitive. Here we show the results with the prophage repeat primers.

Eight grove-grown orange trees were tested. The previously diseased trees recovered to a healthy phenotype after injection. qPCR analysis showed that those treated plants (trees #1, #2, #4 and #5) had diminishing levels of CLas, decreasing as much as 3,000 fold, as compared to the diseased tree #3 but they still had detectable CLas, whereas CLas was not detected in the non-injected one-year-old healthy trees #6, #7 and #8 (FIG. 2A).

Likewise, in the growth chamber, the symptomatically diseased plant had a high level of CLas DNA (FIG. 2B). After injection of Agent G, the phenotype of the diseased plant appears gradually improved with greener leaves. At 3 weeks and 5 weeks after injection, CLas DNA levels dropped 1,100~3,100 folds to very low, although detectable, levels in both newly emerged leaves and older leaves that existed prior to injection (FIG. 2B). These qPCR results indicate that one-time injection of Agent G greatly reduced the CLas bacterial load in the leaves, although total CLas elimination was not achieved.

Detection of CLas Prophages and Gene Expression

All pathogenic CLas strains are known to have prophages. Due to the presence of CLas bacteria, CLas phage lytic genes (holing, glutathione peroxidase, tail fiber, endolysin and peroxidase) were all detected in the diseased plant (FIG. 3). Three or 5 weeks after injection, the relative dosages of these phage genes greatly decreased (FIG. 3A-C), or in some cases undetectable (FIG. 3D, E). This observation is consistent with the detection of CLas bacterial DNA (FIG. 2), confirming the co-existence of prophages with CLas bacteria in the diseased plants.

Interestingly, transcription of prophage genes holin and glutathione peroxidase was apparently elevated after Agent G injection as compared to before injection (FIG. 4A, B). There was also marked expression of phage tail fiber gene after injection (FIG. 4C). This becomes more striking when considering much lower gene dosages after injection (FIG. 3A, B, C). No transcription was detected for prophage genes endolysin and peroxidase.

Scanning Electron Microscopy Examination

Leaves of field-grown trees #3 (diseased) and #6 (healthy) were examined by scanning electron microscopy (SEM). Consistent with the qPCR results (FIG. 2), SEM revealed bacterial colonization inside the phloem fiber cells of the infected tree (FIG. 5A, B). Rod-shaped bacteria were found clumped together and clogged the phloem fiber cells. By contrast, the leaves of the healthy tree, where CLas was not detected by qPCR (FIG. 2A), showed the phloem tissue clear of deposits, indicating a clean, smooth vascular system (FIG. 5C, D).

Similarly, SEM exhibited significant clogs in the phloem tissue of the lab-grown diseased plant before injection (DO; FIG. 6A, B), which was found to have a high level of CLas bacterial DNA (FIG. 2B). Three to five weeks after injection, bacterial colonies in the phloem fiber tissues diminished markedly although not completely disappeared (FIG. 6C to H). These results further indicate that injection of Agent G promotes clearance of CLas bacterial clogs in phloem tissue.

Chemical Composition Analysis of Agent G

The chemical composition of Agent G was evaluated by NMR and GC/MS analysis. The 1H NMR spectrum (FIG. 7A) of Agent G revealed a complex mixture of compounds. The major components included a series of compounds containing proton signals in the olefinic region between 5-6 ppm and doublet signals between 3-4 ppm, consistent with thioallylic protons, and indicated the presence of allyl polysulfides as observed in the 1H NMR spectrum of garlic oil. In addition, the 1HMR spectrum revealed the proton signals of aromatic aldehydes at δ 9.67 and 9.62 ppm and a series of signals in the aromatic and olefinic region of the spectrum consistent with phenylpropanoids. This was confirmed with a series of cross peaks between these signals in the 1H-1H COSY spectrum (FIG. 7B) and allowed the identification of (E)-cinnamaldehyde and o-hydroxycinnamaldehyde, as previously observed in 1H NMR spectrum of cinnamon oil. The NMR data also revealed the presence of other signals associated with fatty acids, carbohydrates and steroids.

Figure 8A:
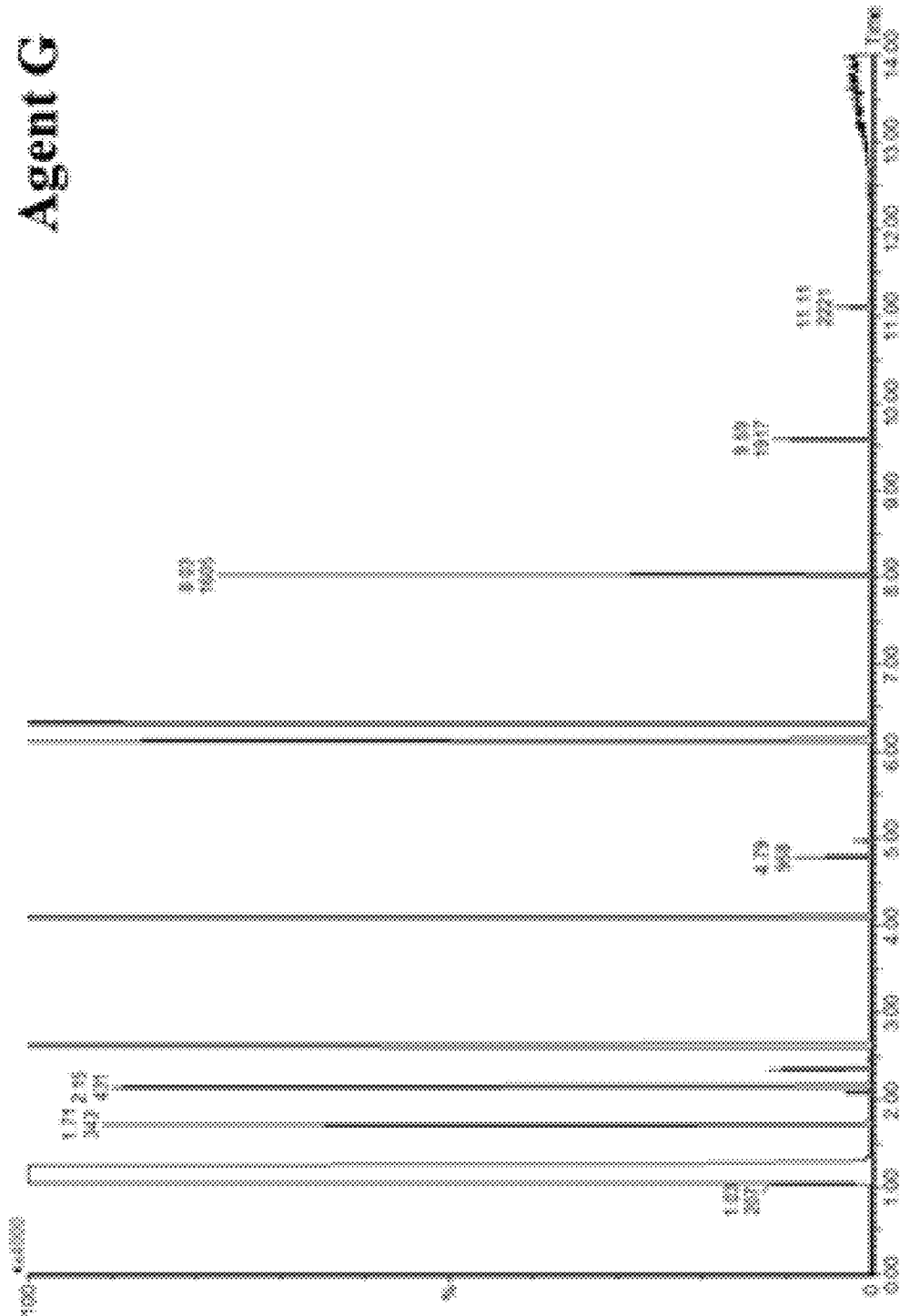
FIG. 8A is a chromatogram plot of total ion chromatograms from the GC/MS of the hexane extraction of Agent G only.

Furthermore, the GC/MS of the hexane extract of Agent G showed the presence of a large number of compounds with six major compounds being identified based on the NIST library search (Table 1; FIG. 8A). These compounds were mostly allyl polysulfides with the major compounds being diallyl disulfide and diallyl trisulfide from garlic oil and cinnamaldehyde from cinnamon oil, as previously identified by NMR. The GC/MS also revealed the presence of an unknown compound (compound Y) with retention time of 9.59 minutes and a molecular ion at m/z 147 (FIG. 8A) that could not be identified.

Trees with no yield during the 2014-15 season recovered sufficiently to produce more than 45 kg of healthy orange fruits per injected tree in the 2016-2017 season.

Discussion

Figure 1:
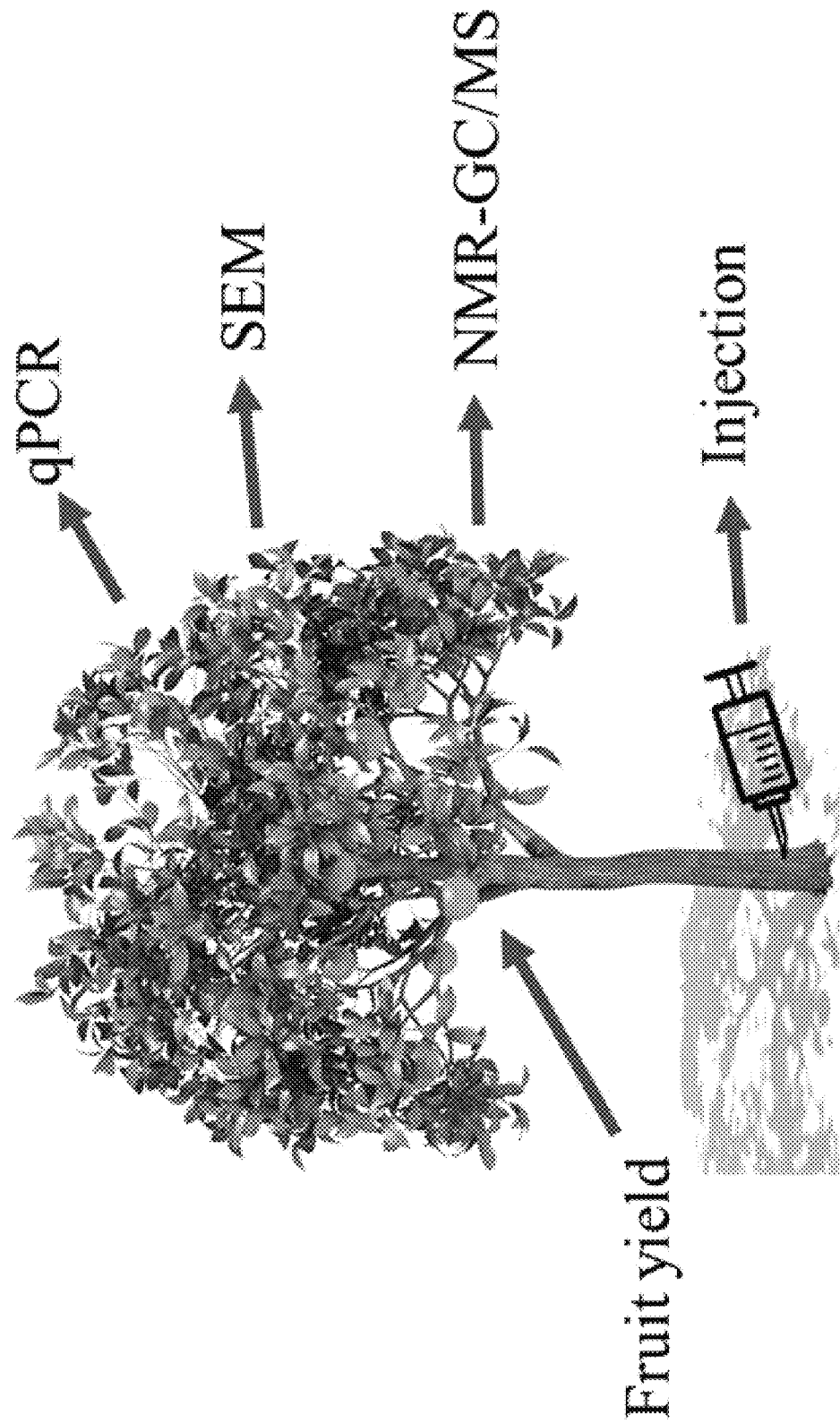
FIG. 1 is a graphical depiction of a citrus greening disease treatment.
Figure 2A:
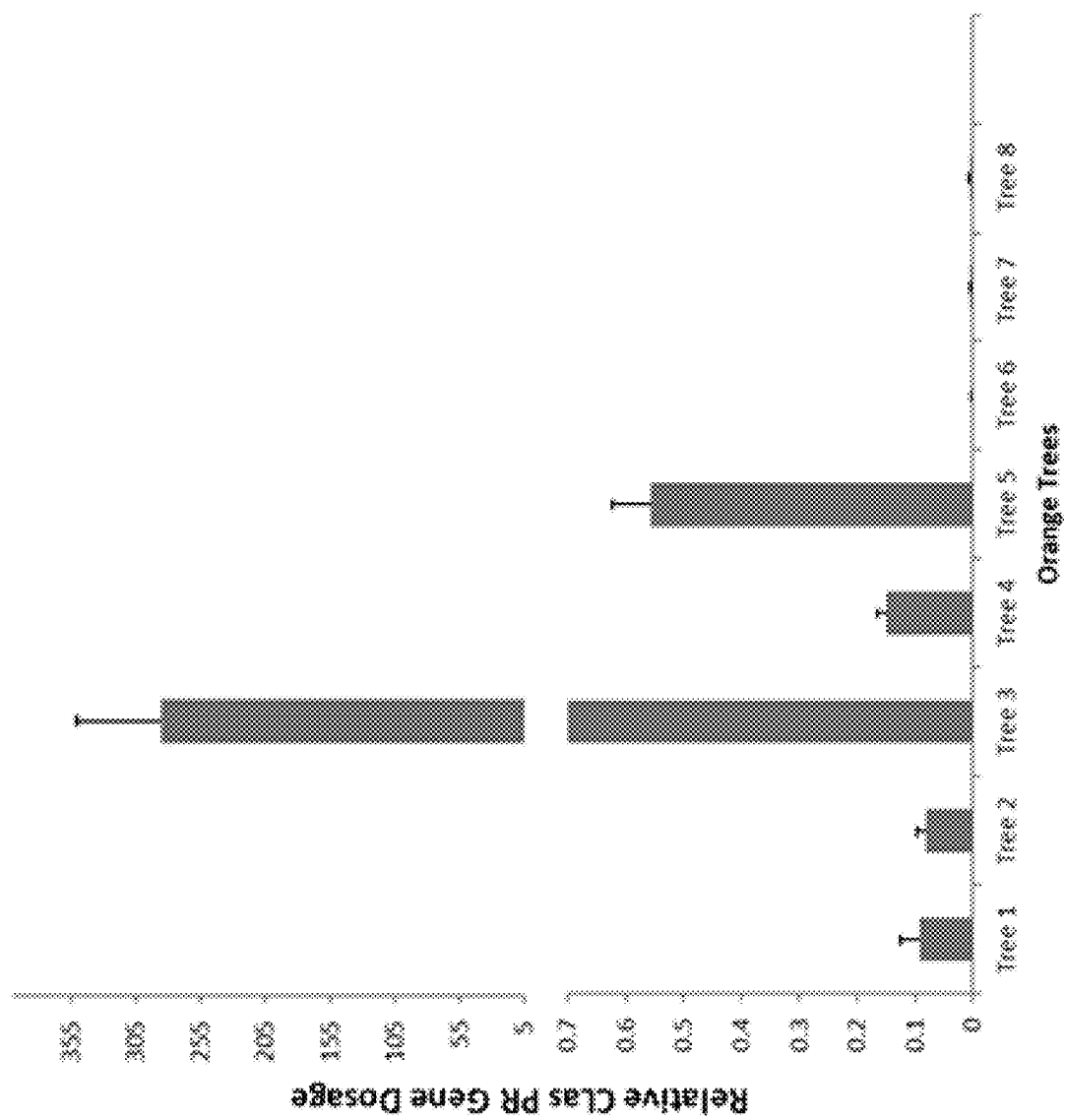
FIG. 2A is a graph of relative CLas gene dosage for orange trees that are treated and untreated at specified time intervals after injection.
Figure 2B:
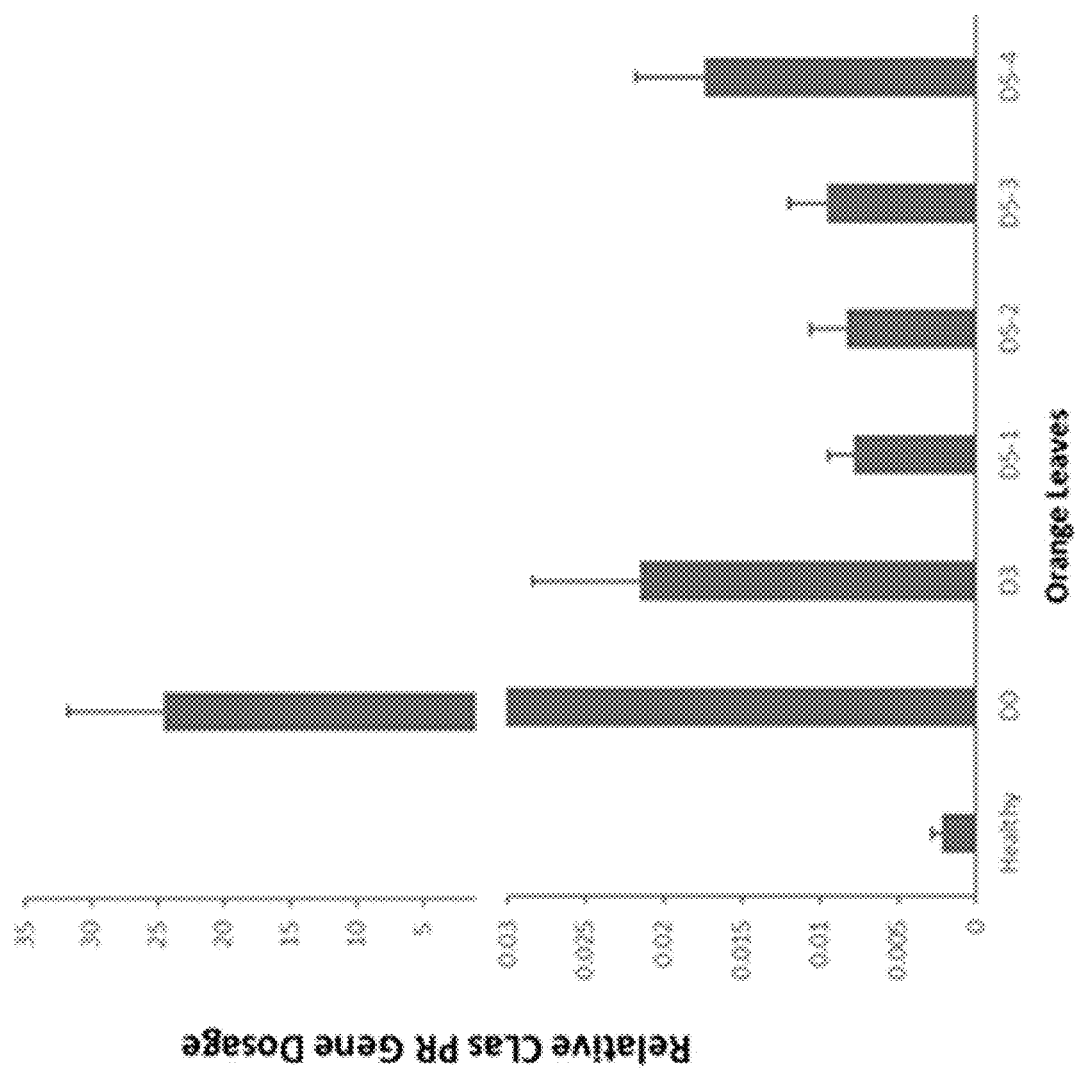
FIG. 2B is a graph of relative CLas gene dosage for orange trees that are treated and untreated at specified time intervals after injection.
Figure 3A:
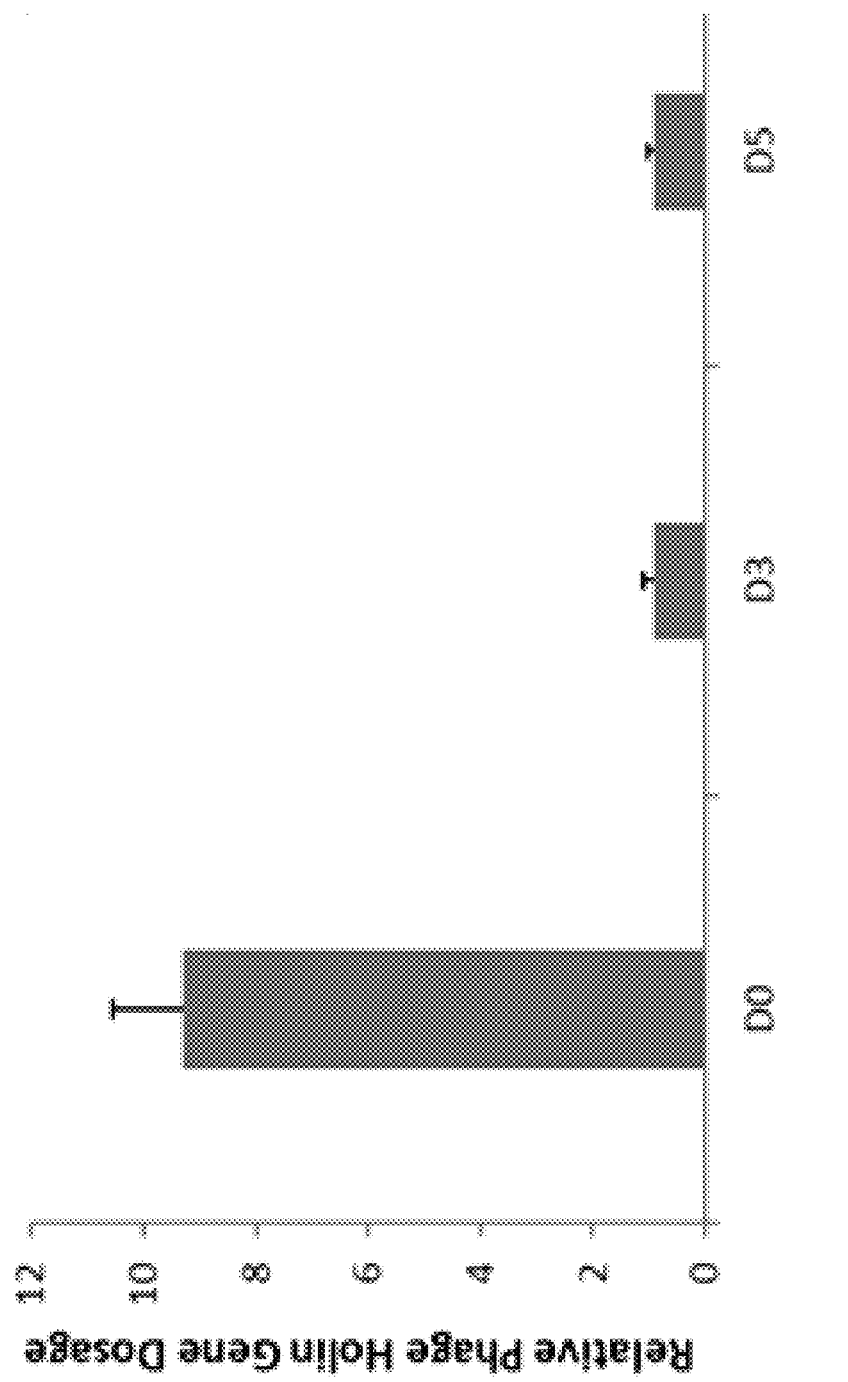
FIG. 3A is a graph of CLas phage DNA for orange trees that are treated and untreated at specified time intervals after injection.
Figure 3B:
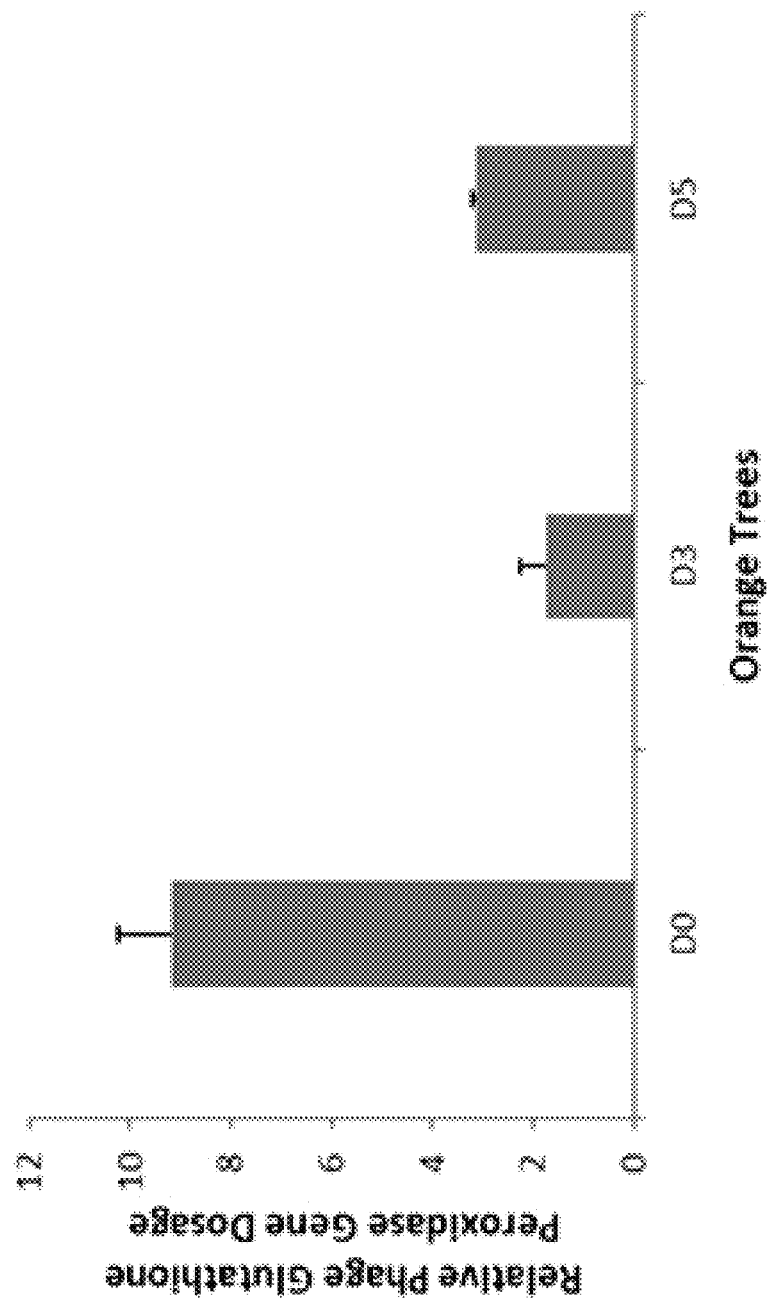
FIG. 3B is a graph of CLas phage DNA for orange trees that are treated and untreated at specified time intervals after injection.
Figure 3C:
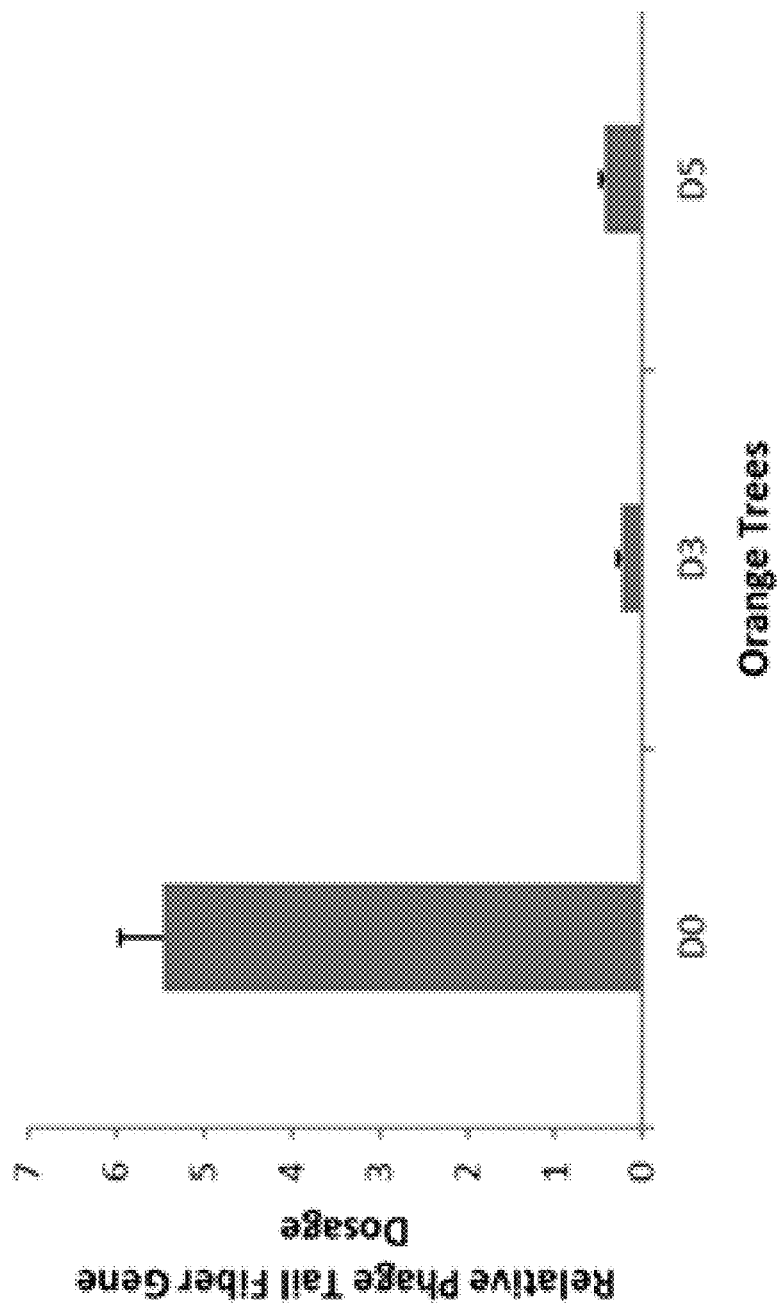
FIG. 3C is a graph of CLas phage DNA for orange trees that are treated and untreated at specified time intervals after injection.
Figure 3D:
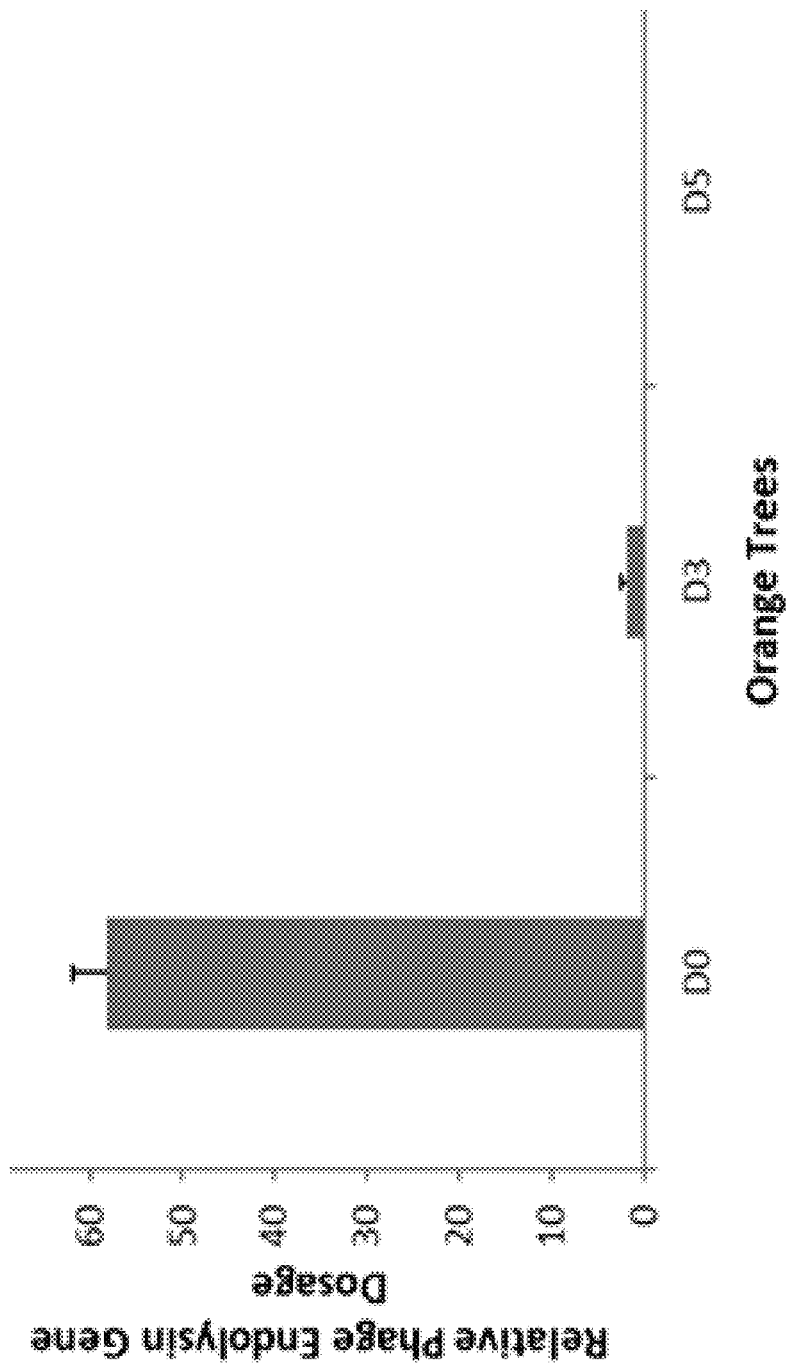
FIG. 3D is a graph of CLas phage DNA for orange trees that are treated and untreated at specified time intervals after injection.
Figure 3E:
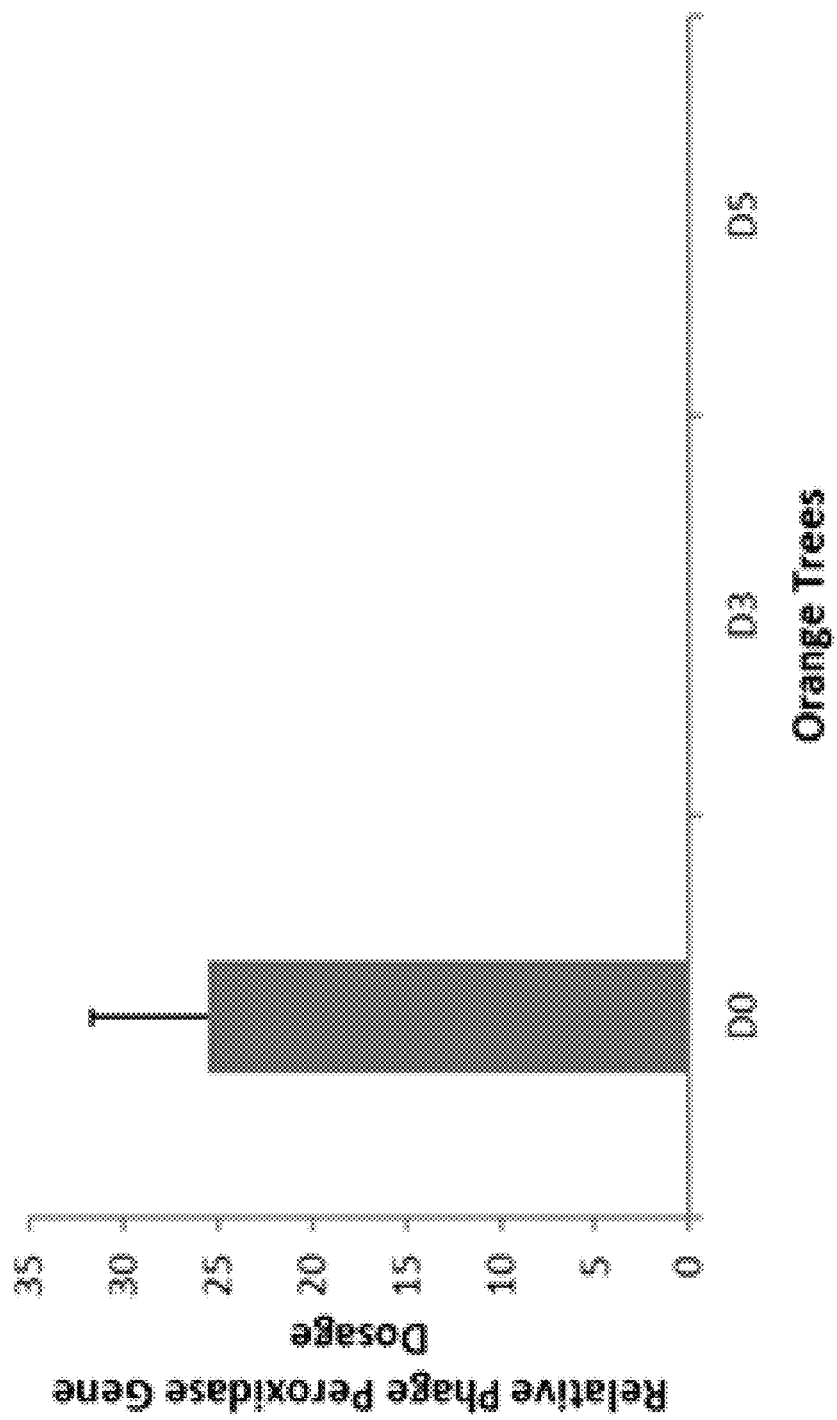
FIG. 3E is a graph of CLas phage DNA for orange trees that are treated and untreated at specified time intervals after injection.
Figure 4A:
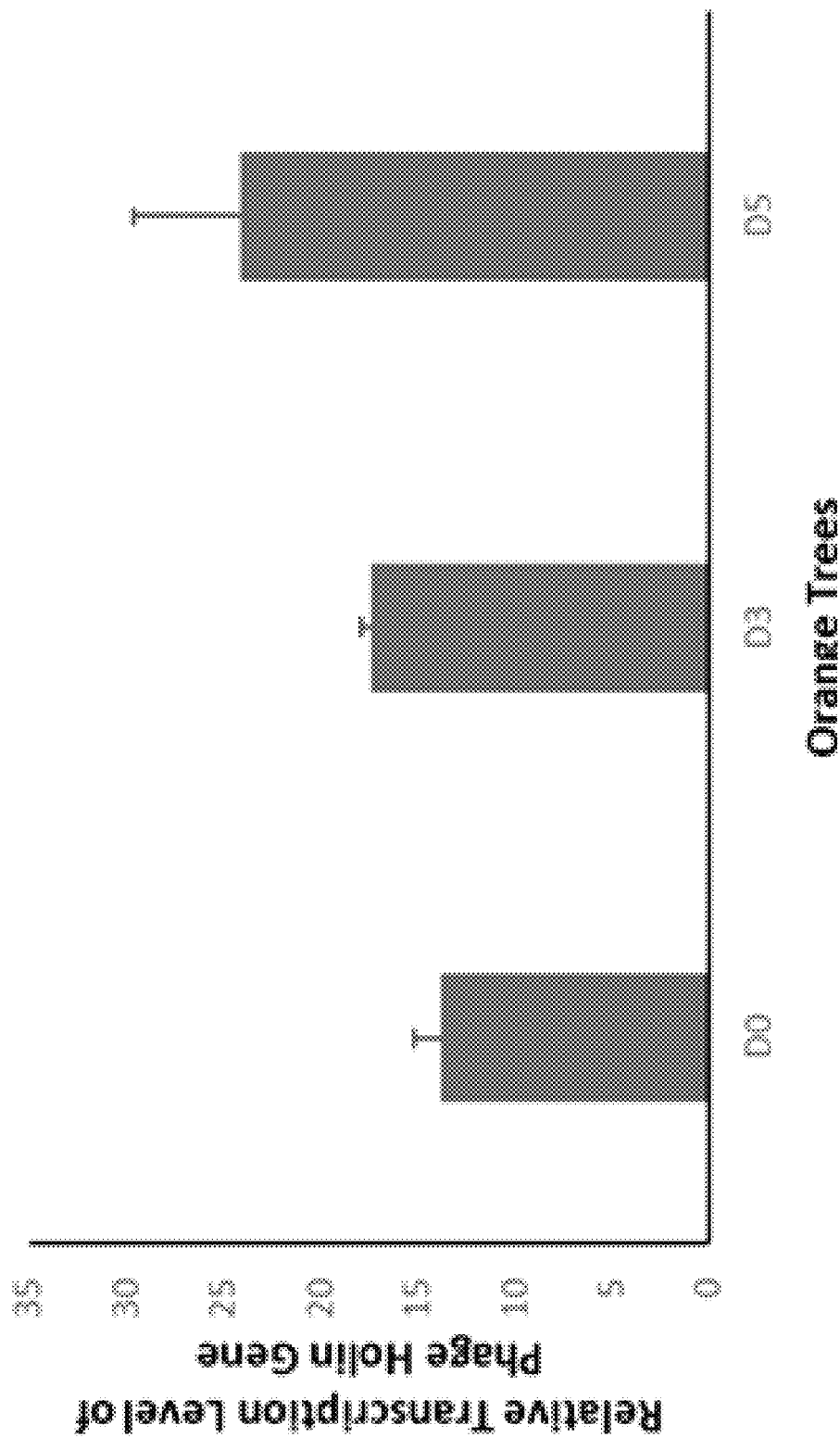
FIG. 4A is a graph of transcription of CLas gene dosage for orange trees that are treated and untreated at specified time intervals after injection.
Figure 4B:
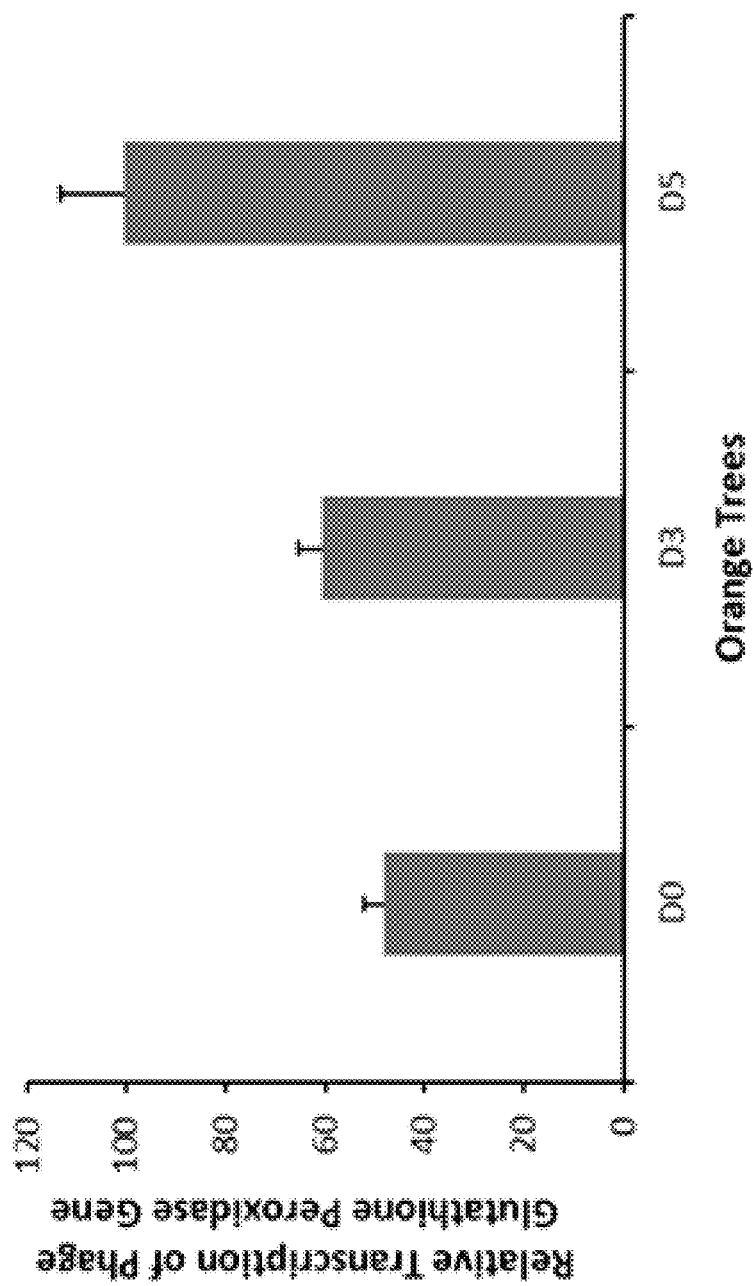
FIG. 4B is a graph of transcription of CLas gene dosage for orange trees that are treated and untreated at specified time intervals after injection.
Figure 4C:
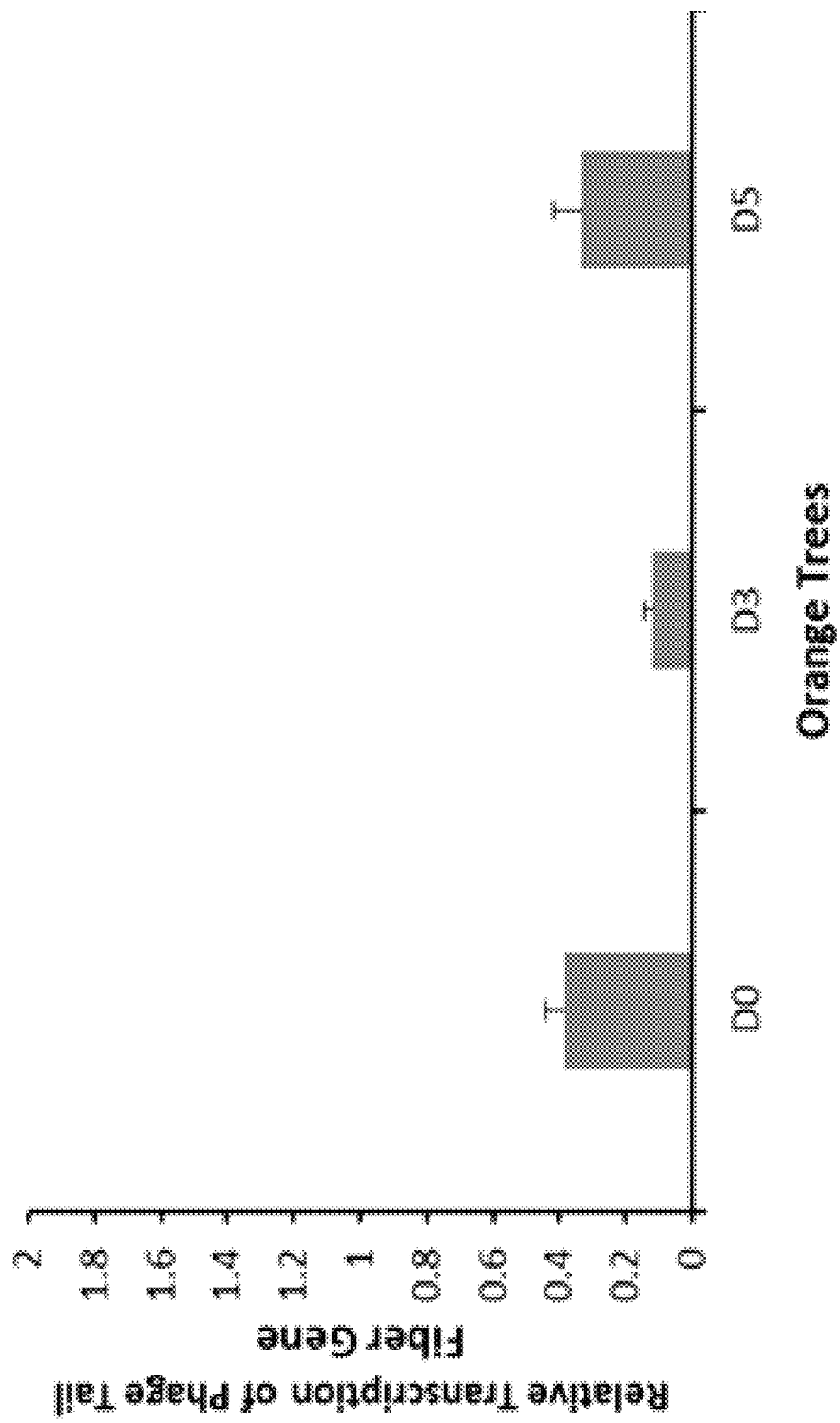
FIG. 4C is a graph of transcription of CLas gene dosage for orange trees that are treated and untreated at specified time intervals after injection.
Figure 5A:
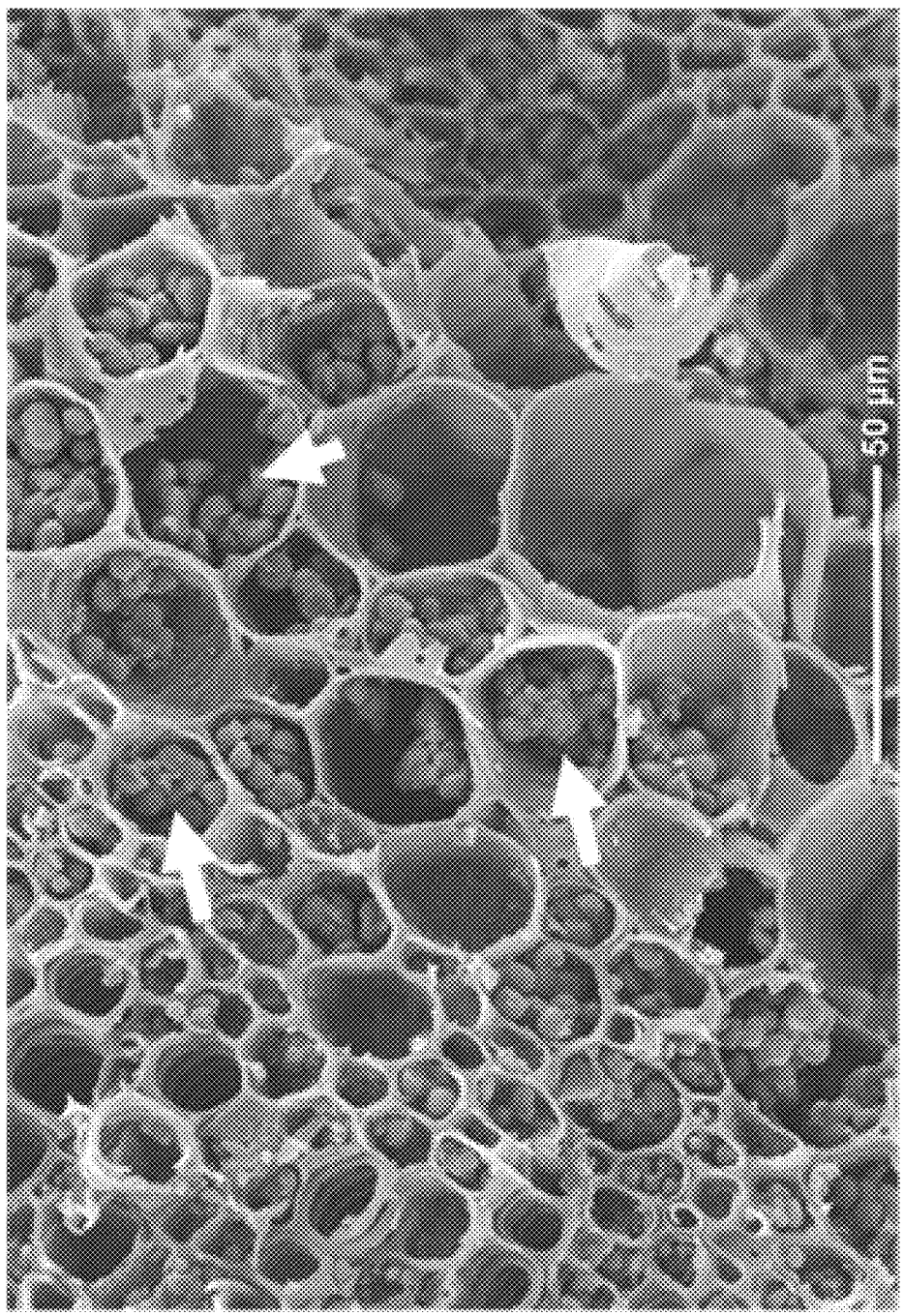
FIG. 5A is an SEM images of leaf cross sections of orange plants or orange trees of the diseased orange tree #3 at magnification of ×550 (A)
Figure 5B:
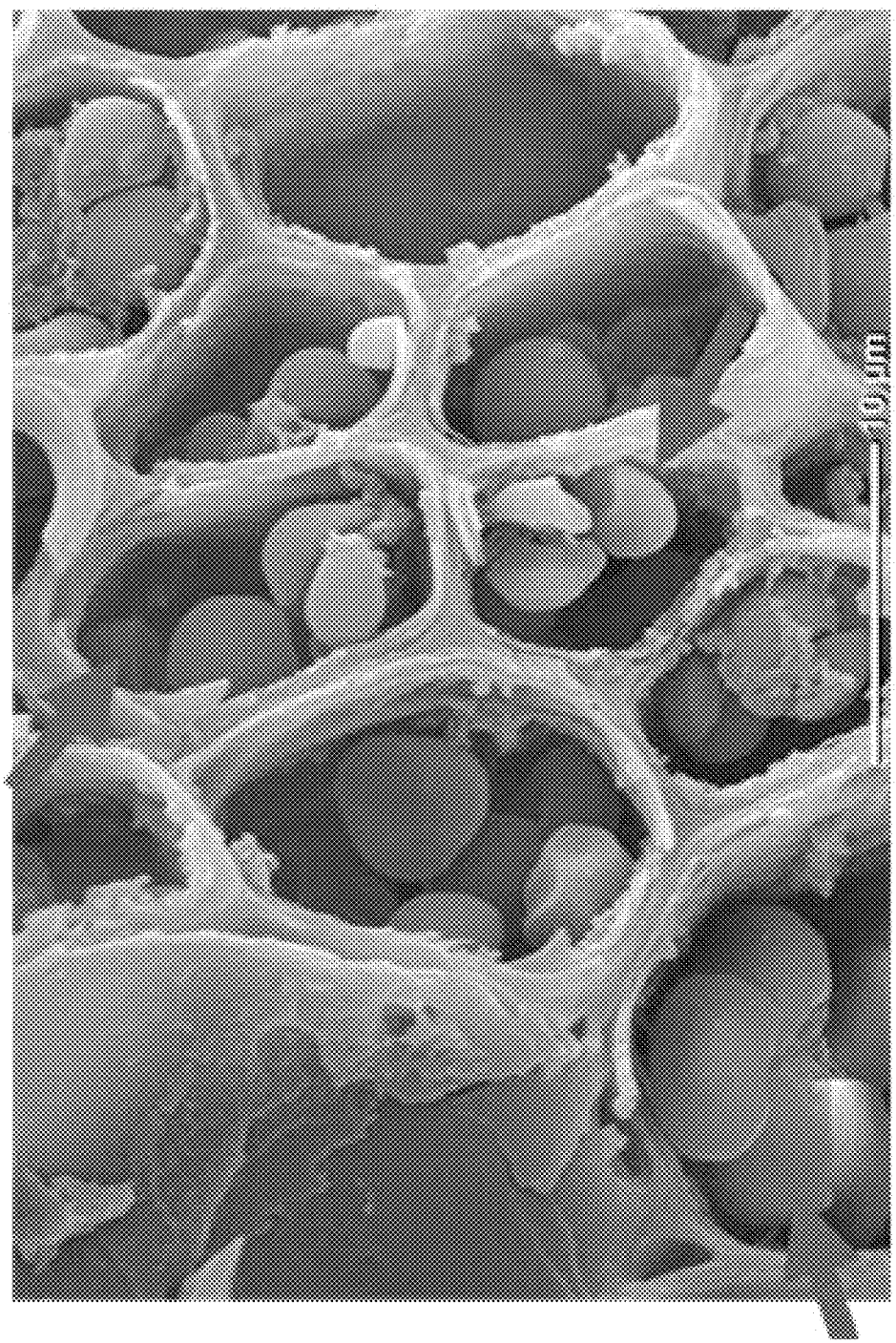
FIG. 5B is an SEM image of leaf cross sections of orange plants or orange trees of the diseased orange tree #3 at magnification of ×3,000.
Figure 5C:
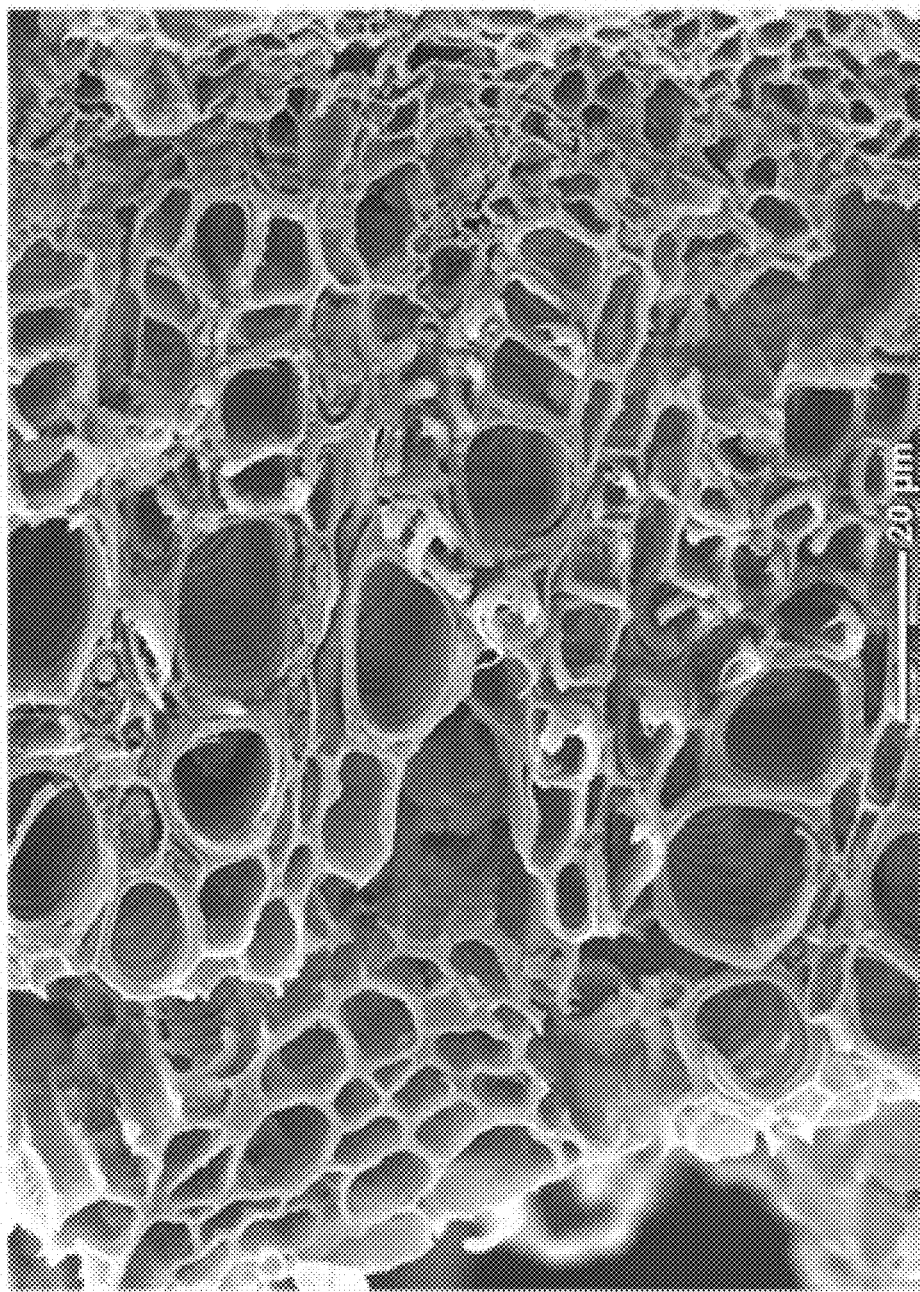
FIG. 5C is an SEM image of leaf cross sections of orange plants or orange trees of the healthy orange tree #6 at magnification of ×800.
Figure 5D:
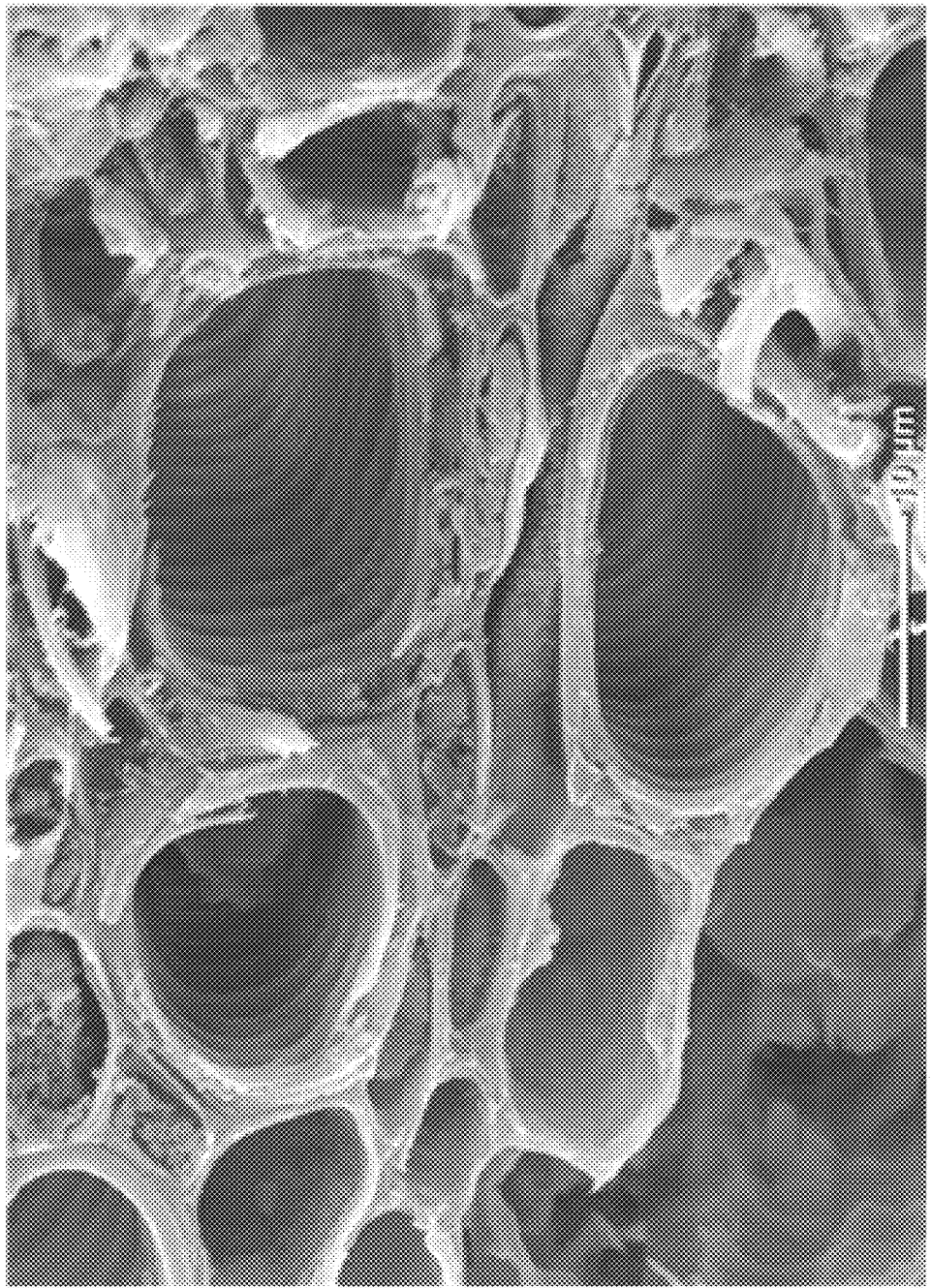
FIG. 5D is an SEM image of leaf cross sections of orange plants or orange trees of the healthy orange tree #6 at magnification of ×2000.
Figure 6A:
FIG. 6A is an SEM images of leaf cross sections of orange plants of diseased orange plant before injection (DO) at magnification of ×340.
Figure 6B:
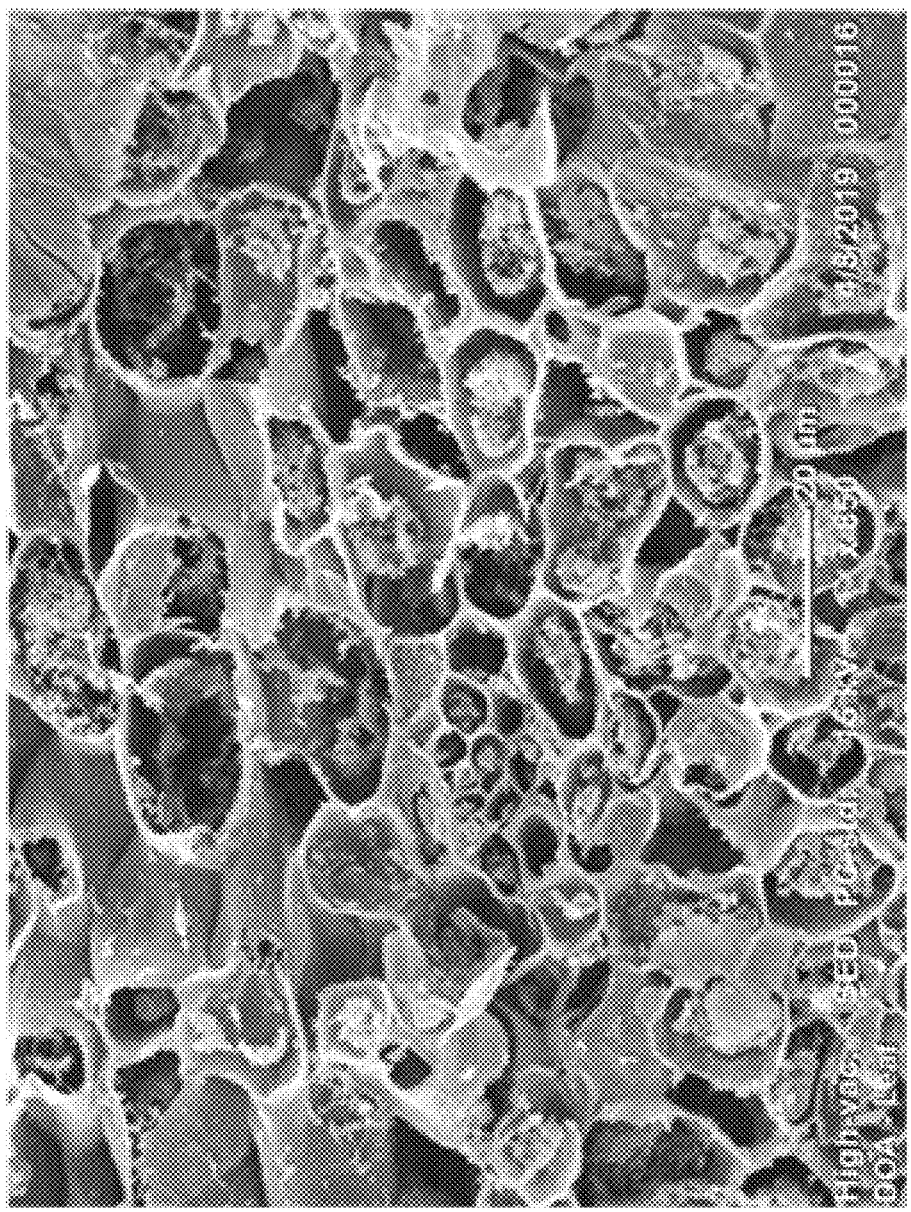
FIG. 6B is an SEM image of leaf cross sections of orange plants of diseased orange plant before injection (DO) at magnification of ×850.
Figure 6C:
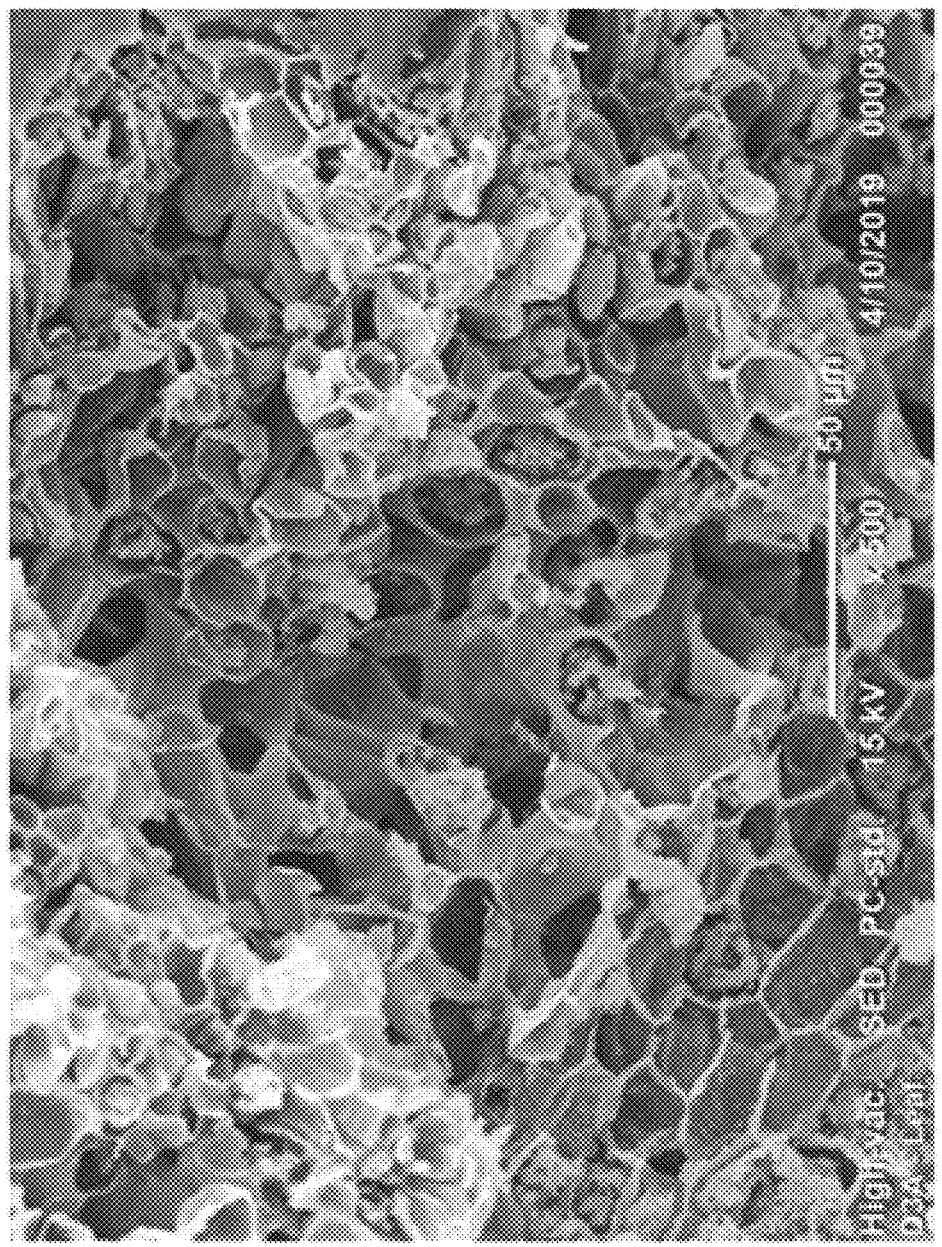
FIG. 6C is an SEM image of leaf cross sections of orange plants of diseased orange plant three weeks after injection (D3) at magnification of ×500.
Figure 6D:
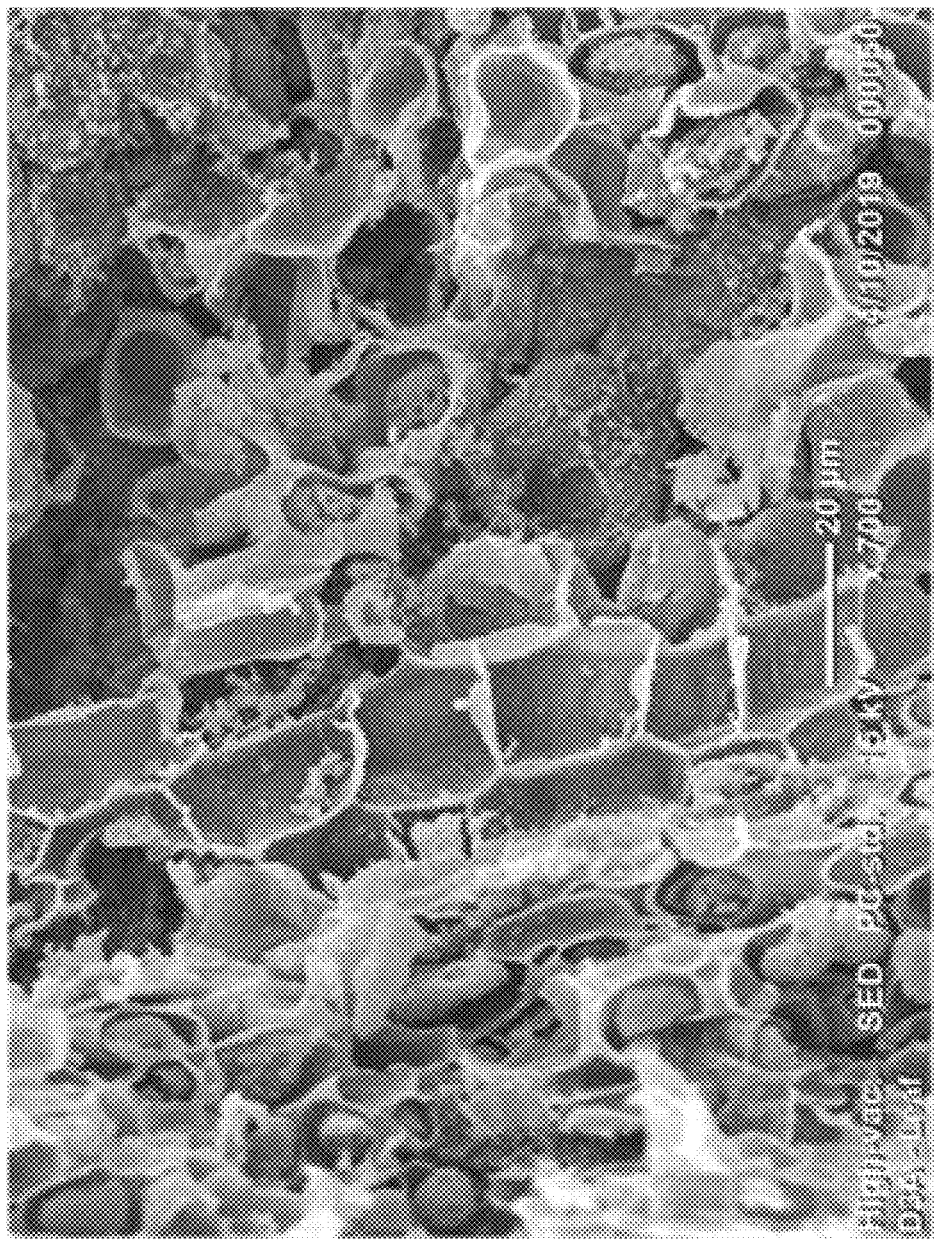
FIG. 6D is an SEM image of leaf cross sections of orange plants of diseased orange plant three weeks after injection (D3) at magnification of ×700.
Figure 6E:
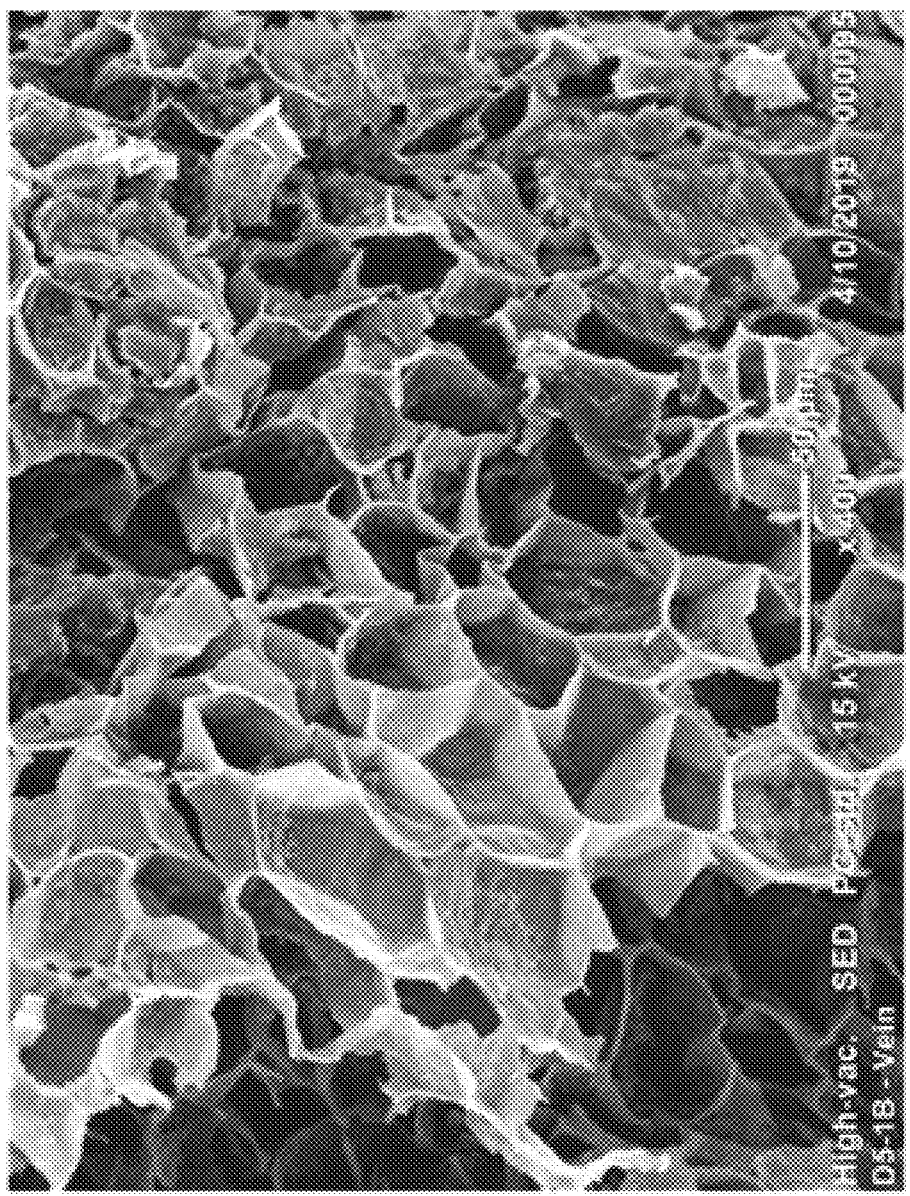
FIG. 6E is an SEM image of leaf cross sections of orange plants of diseased orange plant five weeks after injection (D5-1) at magnification of ×400.
Figure 6F:
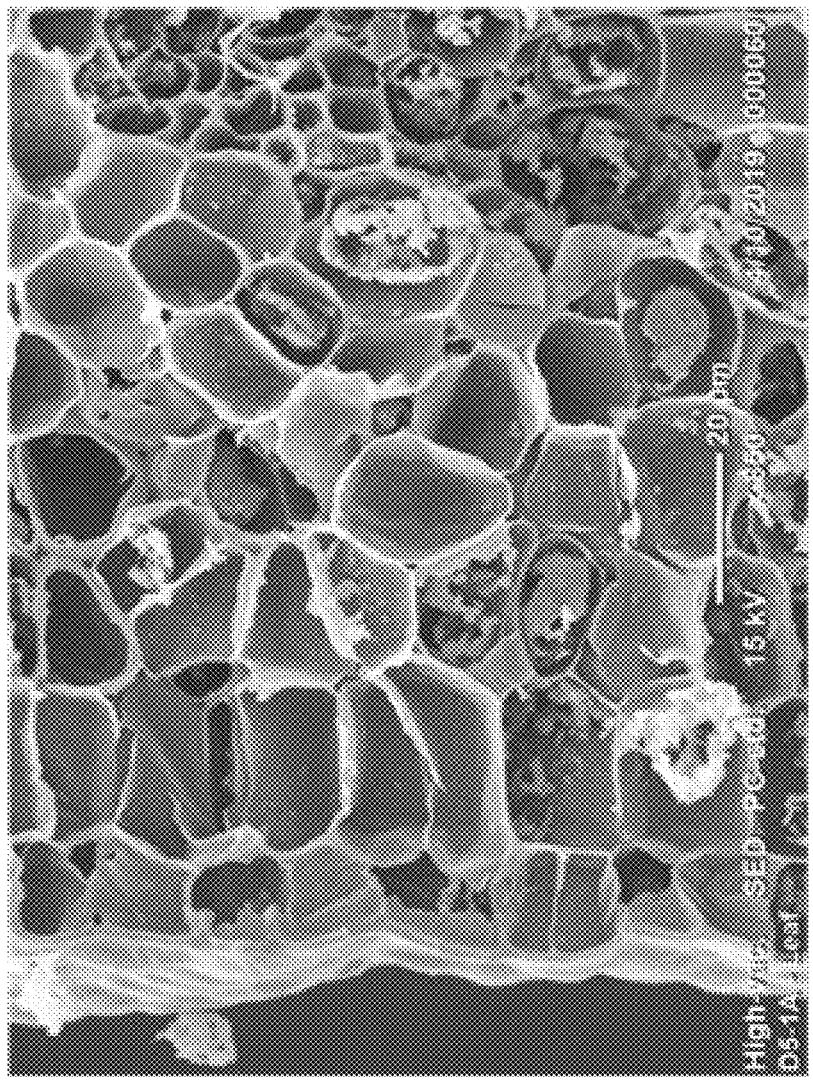
FIG. 6F is an SEM image of leaf cross sections of orange plants of diseased orange plant five weeks after injection (D5-1) at magnification of ×850.
Figure 6G:
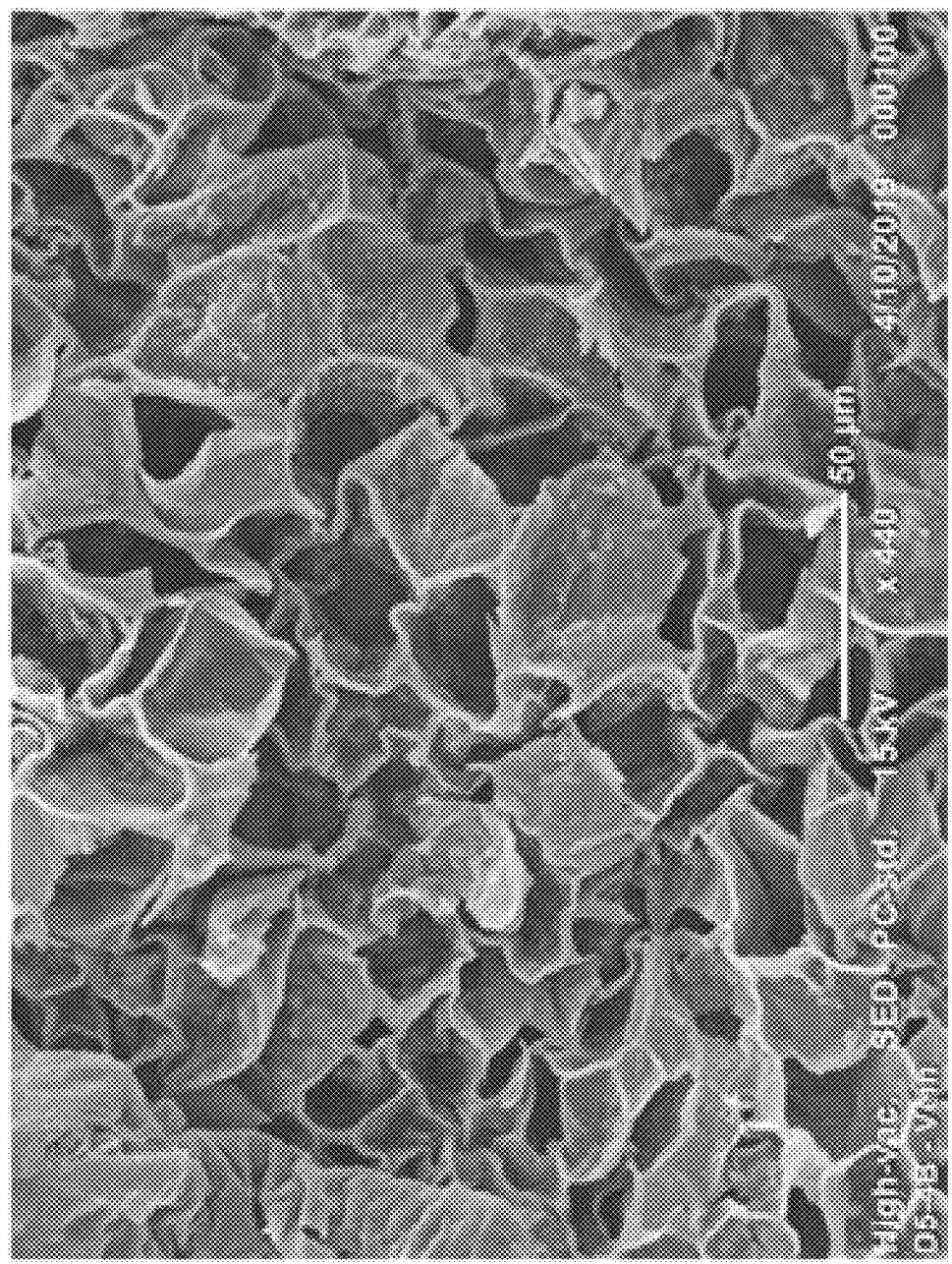
FIG. 6G is an SEM image of leaf cross sections of orange plants of diseased orange plant five weeks after injection (D5-4) at magnification of ×440.
Figure 6H:
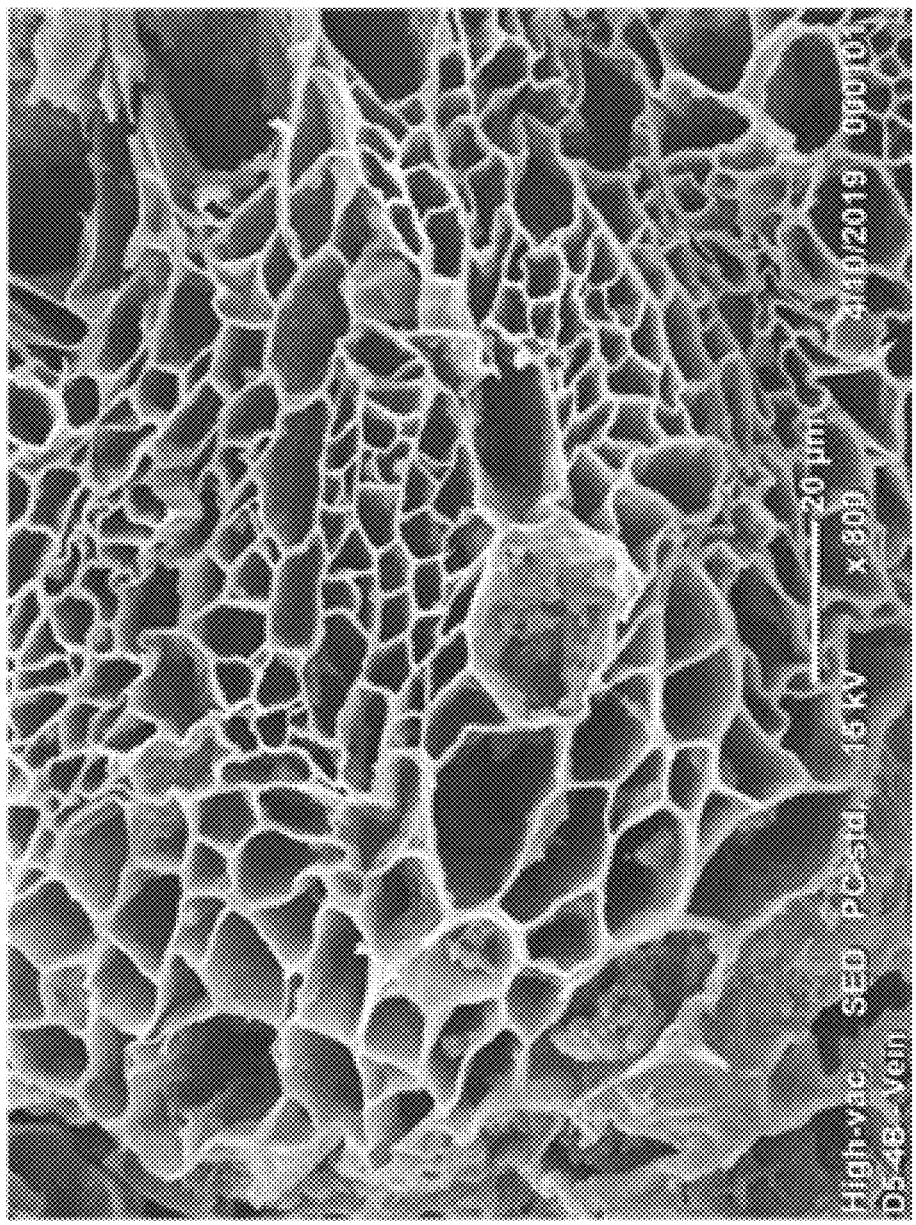
FIG. 6H is an SEM image of leaf cross sections of orange plants of diseased orange plant five weeks after injection (D5-4) at magnification of ×800.

Our studies found that injection of the plant extract cocktail Agent G through phloem is effective in treating green disease in orange plants. This conclusion is based on following observations: first, after injection, the levels of CLas, the causing pathogen for citrus greening disease, decreased thousands fold in the leaves, as indicated by qPCR using CLas specific primers (FIG. 2). Second, after injection, the levels of CLas prophage DNA also decreased significantly, yet some prophage gene expression was elevated (FIGS. 3 and 4). Third, after injection, the bacterial clogs in phloem tissue were noticeably lessened, in contrast with heavily clogged phloem fiber cells before injection, as revealed by scanning electron microscopy (FIGS. 5 and 6). Finally, although empirically, after injection, the diseased plants recovered in growth phenotypically and fruit production recovered, as compared to the untreated non-producing diseased trees.

TABLE 1

Major compounds identified in Agent G from GC/MS and migration rates.

| Number | Compound Name | CAS number | Molecular Formula | Retention Time | Mass Spec (m/z) | Distance Traveled | Migration Rate (cm/hr) |
|---|---|---|---|---|---|---|---|
| 1 | 2,5-Dimethyl-1,3,4-thiadiazole | 27464-82-0 | $C_4H_6N_2S$ | 1.71 | 114 | 14 cm | 1.75 |
| 2 | Diallyl disulfide | 2179-57-9 | $C_6H_{10}S_2$ | 4.10 | 146 | 24 cm | 3.0 |
| 3 | Cinnamaldehyde | 104-55-2 | $C_9H_8O$ | 6.12 | 132 | 12 cm | 1.50 |
| 4 | Diallyl Trisulfide | 2050-87-5 | $C_9H_{10}S_3$ | 6.32 | 178 | 26 cm | 3.25 |
| 5 | Allyl Thiopropionate | 41820-22-8 | $C_6H_{10}OS$ | 8.02 | 146 | 24 cm | 3.0 |
| 6 | Unidentified Compound Y | — | — | 9.59 | 147 | 18 cm | 2.25 |

Phloemic Migration Rate

Figure 8B:
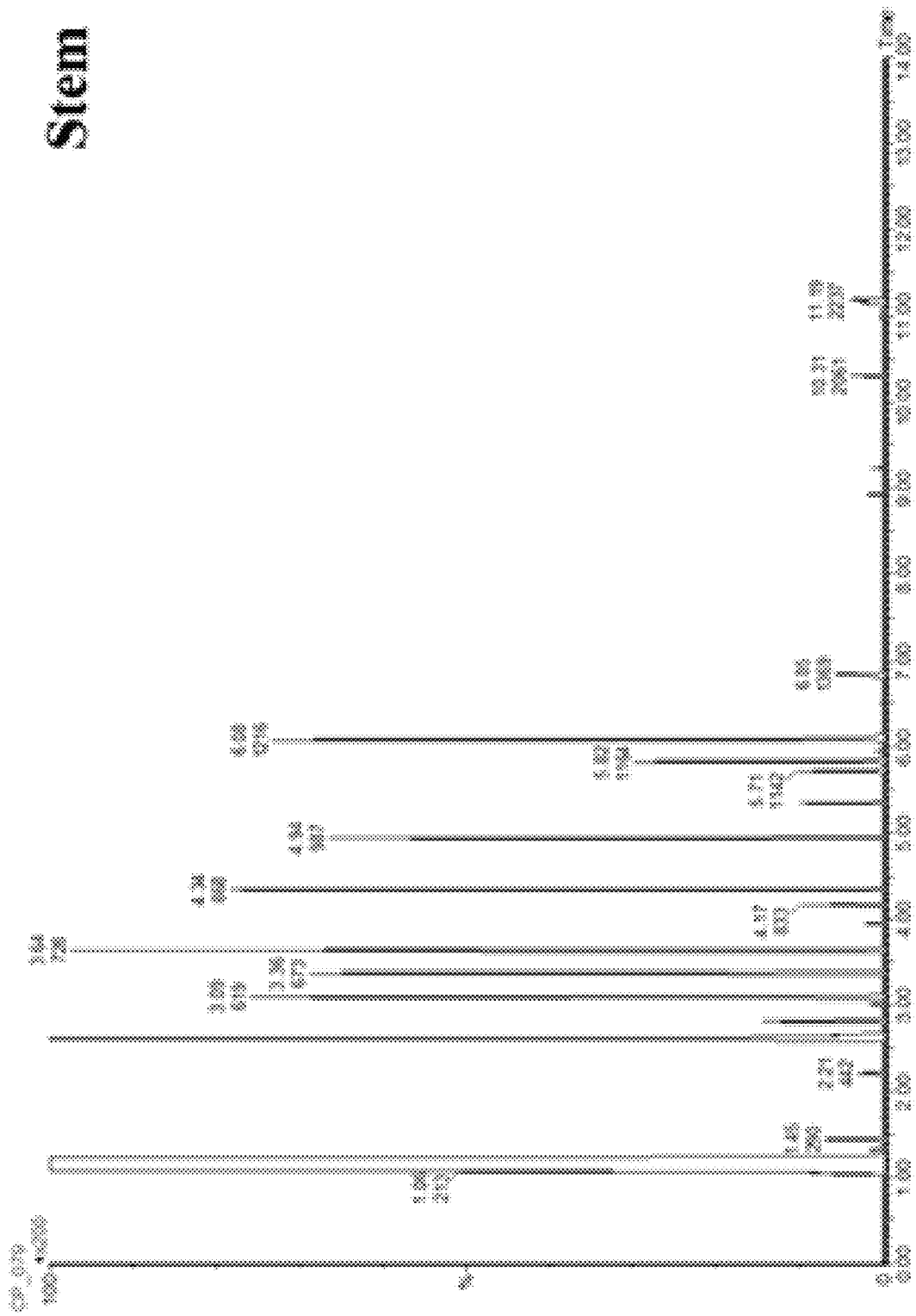
FIG. 8B is a chromatogram plot of total ion chromatograms from the GC/MS of the hexane extraction of a stem without treatment.
Figure 8C:
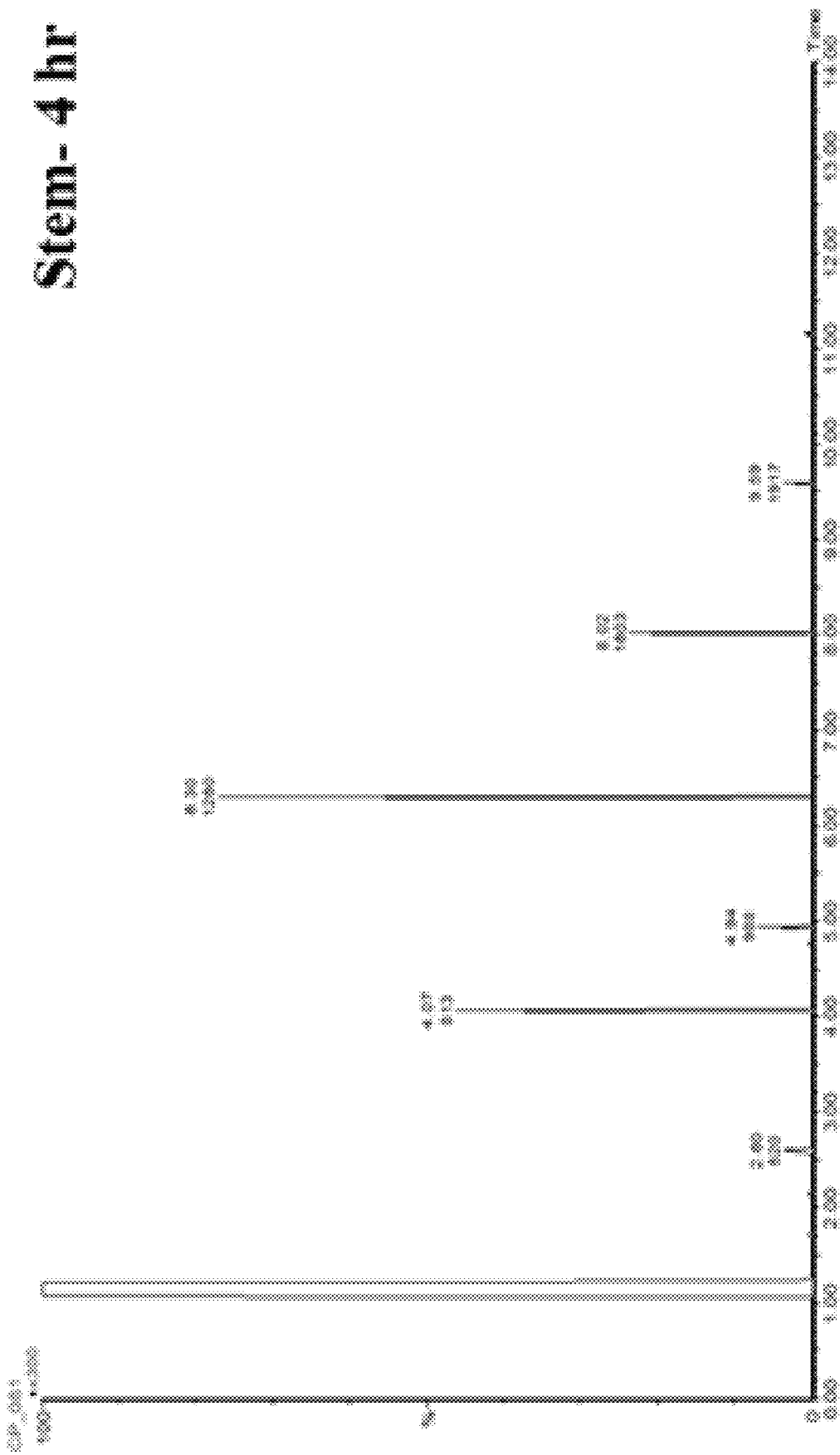
FIG. 8C is a chromatogram plot of total ion chromatograms from the GC/MS of the hexane extraction of an 8-10 cm stem absorbing Agent G for 4 hr.

To assess the phloemic migration of the injected reagent, stem segments (FIG. 8B, C) were extracted with hexane and analyzed by GC/MS to identify common volatile components. Only one compound, the monoterpenoid citral or lemonal, with a retention time of 6.08 min. overlapped with cinnamaldehyde with a retention time of 6.12 min. However, as the mass and the fragmentation pattern was different for that of citral, the migration rate of cinnamaldehyde in the stem could still be determined. GC/MS analysis of the stem sections without treatment served as base profile (FIG. 8B). After absorption in Agent G for 4 hours the 8-10 cm stem segment revealed only the major components, diallyl disulfide and diallyl trisulfide (FIG. 8C) but not in the 18-20 cm or the 28-30 cm sections of the stem. After 8 hours soaking all six major components of Agent G were detected in sections of the stem at various distances (Table 1). Migration rates were estimated to be in a range of 1.5-3.25 cm/hr, which confirm the ability of Agent G to be transported through the phloem (bark).

Field Test

Formulation and testing of plant derived antibacterials for effectiveness against the CLas bacterium began in 2014 with infected orange trees in Sarasota, Fla. It was determined that the efficacy of injections into the phloem of these trees was enhanced by using a cocktail of multiple plant extracts. Five to eight-year-old trees with obvious heavy infection and significant die back were eventually injected in 2015 with the cocktail. Those injected trees recovered phenotypically.

Figure 7A:
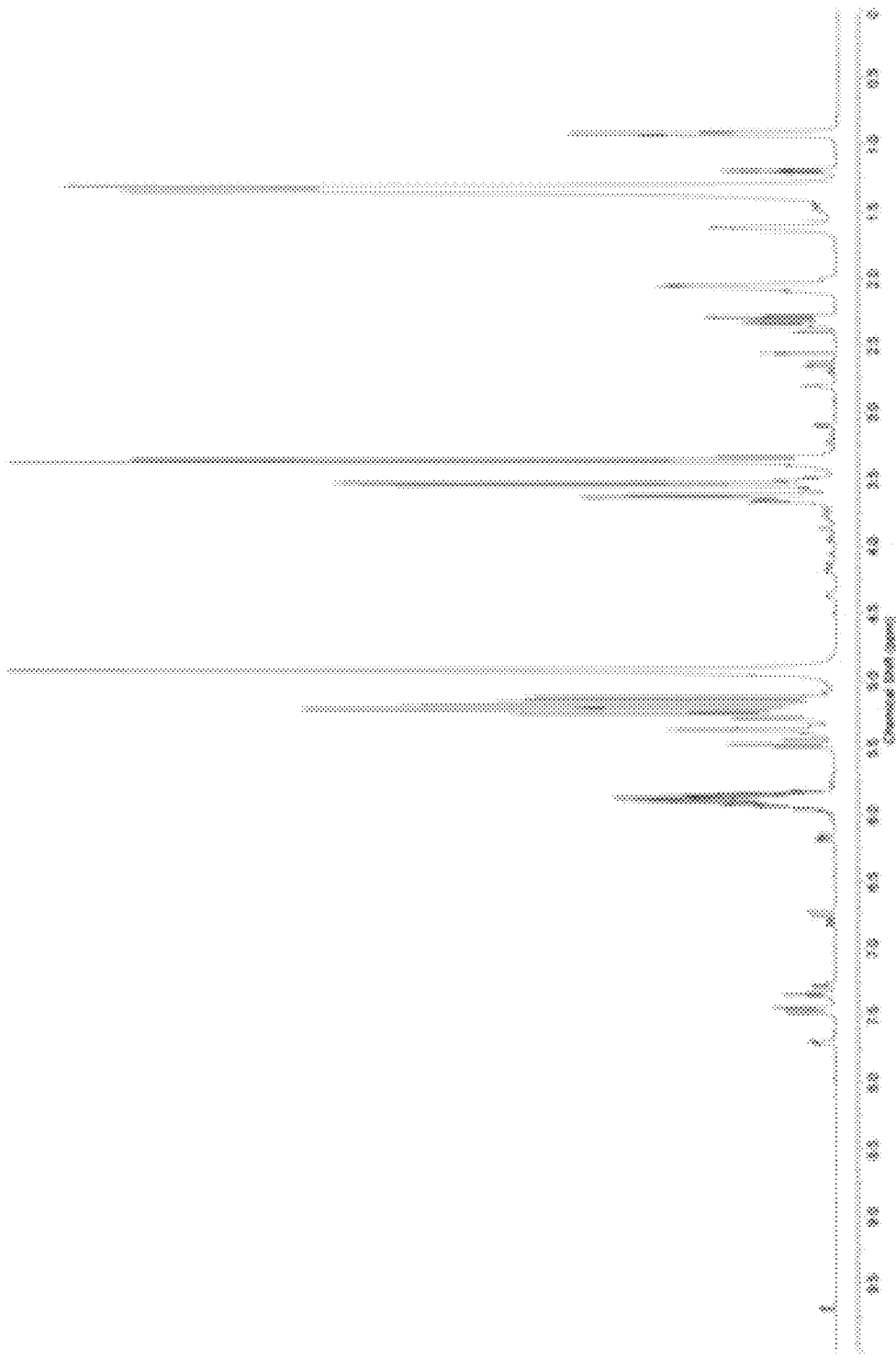
FIG. 7A is an NMR plots of Agent G $CD_3OD$ (500 MHz). in the $^1H$ NMR profile of Agent G.
Figure 7B:
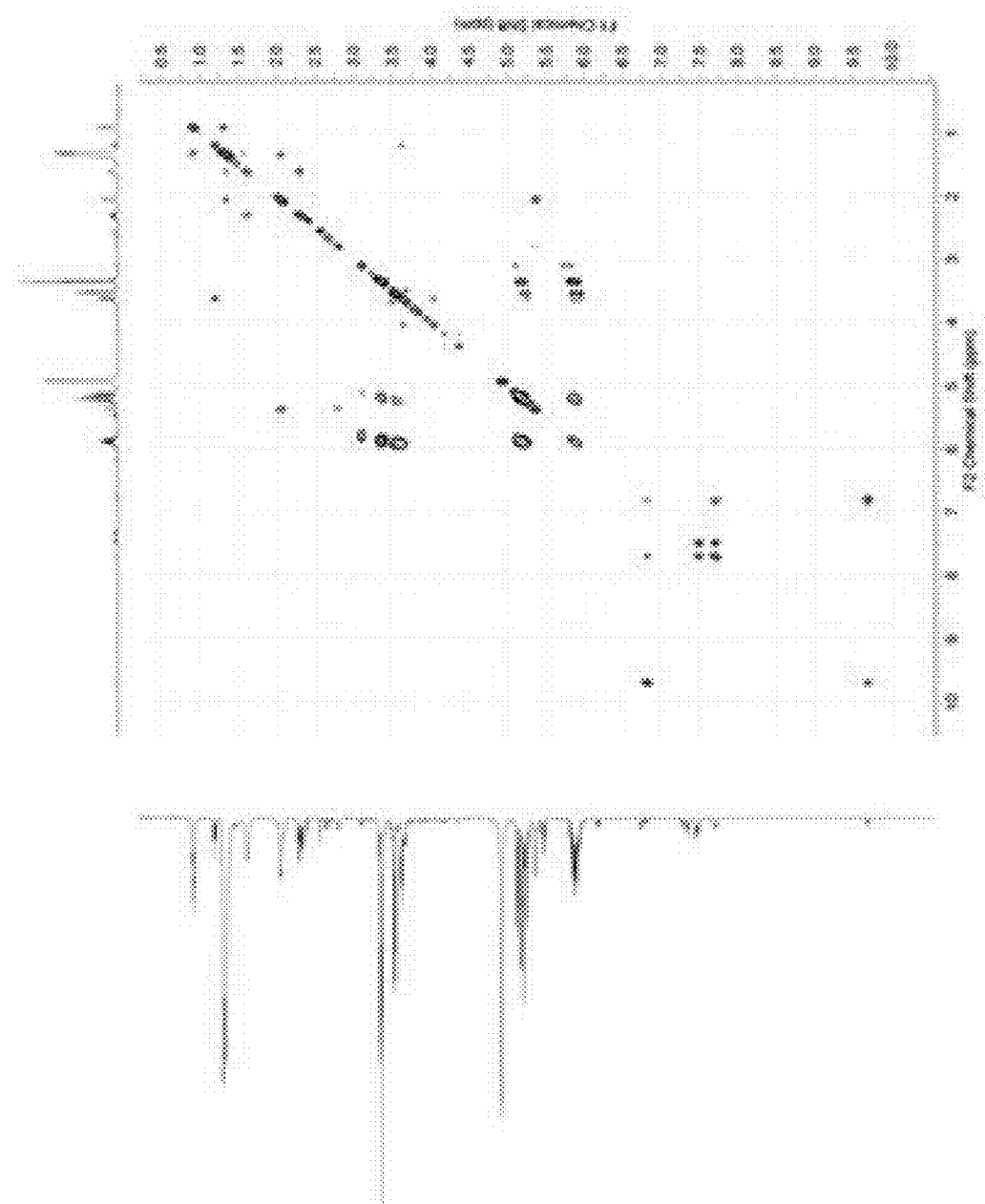
FIG. 7B is an NMR plot of Agent G $CD_3OD$ (500 MHz). in the $^1H$-$^1H$ COSY NMR profile of Agent G.

Our studies clearly show strong inhibitory effect of Agent G on CLas in planta. Various unique compounds of allyl polysulfides and cinnamaldehydes were found in Agent G and the treated stem samples (Table 1; FIGS. 7 and 8) but not in untreated plants. These compounds traveled through the phloem tissues (FIG. 8). Although the active ingredients in Agent G are not precisely known, while not wishing to be bound by theory since allicin, saponins, flavonoids and cinnamaldehyde present in Agent G exhibit antibacterial effects across a broad range of bacteria their direct contact with CLas bacteria through phloem tissues would cause immediate bactericide. Combination of these compounds along with many other unknown plant metabolites may also synergistically enhance the antibacterial effectiveness by Agent G.

Presence of CLas prophages in the infected plants is expected because all known CLas strains possess the prophages. However, it is interesting to observe elevated expression of CLas phage lytic genes holin and glutathione peroxidase, to a lesser extent tail fiber, after phloemic injection. It has been found that expression of CLas prophage genes holin, tail fiber and peroxidases was much higher in infected non-host plant periwinkle than in infected host citrus plants, suggesting a negative association between prophage activity and CLas pathogenicity/infectivity. Particularly, holins are transmembrane proteins that are produced by prophages during late gene expression. Aggregation of holin proteins triggers disruption of bacterial inner membrane, leading to degradation of cell walls and bacterial cell death. It is possible that ingredients of Agent G activated some of the phage lytic genes such as holins and thus promoted the destruction of CLas bacteria. Phage activation leading to bacterial "suicide" can be a powerful means to suppress CLas pathogenicity and cure greening disease.

Due to current dire lack of effective methods to control serious plant diseases, crop growers increasingly turn to antibiotics for quick treatments, such as spraying citrus plants to fight greening disease. This practice of large-scale antibiotic spraying has the potential of facilitating antimicrobial resistance in the environment. Thus, the fact that Agent G is made entirely from plant extracts, without medical antibiotics or toxic, polluting chemicals, makes it environmentally non-impacted and acceptable to both growers and consumers.

There is no reason to expect Agent G acts specifically on bacterium CLas or orange plants. Agent G via phloemic injection should have similar antibacterial effect on other bacterial pathogens and in other plants. Therefore, this regimen could be useful for disease control and management for other crops. Also due to the complex chemical nature of plant extracts in Agent G and possible synergistic effect of these ingredients, application of Agent G should be less likely for bacteria to develop resistance quickly, as opposed to use of formulary antibiotics.

The invention claimed is:

1. An anti-bacterial composition for plants comprising:
garlic oil;
cinnamon oil;
*yucca* stem oil;
oleic acid is present in an amount of from 10 to 20% by weight;
hemp seed oil is present in an amount of from 8 to 12% by weight; and
dimethyl sulfoxide is present in an amount of from 0.5 to 0.15% by weight, the weights based on a total weight of the composition.

2. The anti-bacterial composition for plants of claim 1 wherein garlic oil is present in an amount of from 40 to 50% by weight; cinnamon oil is present in an amount of from 20 to 30% by weight; *yucca* stem oil is present in an amount of from 3 to 7% by weight; the weights based on a total weight of the composition.

3. The anti-bacterial composition for plants of claim 1 wherein garlic oil is present in an amount of 45% by weight; cinnamon oil is present in an amount of 25% by weight; *yucca* stem oil is present in an amount of 5% by weight; oleic acid is present in an amount of 15% by weight; hemp seed oil is present in an amount of 9.9% by weight; and dimethyl sulfoxide is present in an amount of 0.1% by weight, the weights based on a total weight of the composition.

4. The anti-bacterial composition for plants of claim 1 wherein the composition includes allicin, saponins, flavonoids and cinnamaldehyde.

5. The anti-bacterial composition for plants of claim 4 wherein the composition includes 2,5-Dimethyl-1,3,4-thiadiazole, Diallyl disulfide, Cinnamaldehyde, Diallyl Trisulfide, Allyl Thiopropionate and compound Y having a molecular ion at m/z 147.

6. The anti-bacterial composition for plants of claim 1 further including colloidal silver.

7. A method of treating an infected plant comprising the steps of:
forming at least one hole in the phloem of the plant;
injecting a therapeutic amount of a composition comprising garlic oil; cinnamon oil; *yucca* stem oil; oleic acid is present in an amount of from 10 to 20% by weight; hemp seed oil is present in an amount of from 8 to 12% by weight; and dimethyl sulfoxide is present in an amount of from 0.5 to 0.15% by weight, the weights based on a total weight of the composition;
sealing the at least one hole.

8. The method of claim 7 wherein the plant is infected with Candidatus Liberibacter *asiaticus* (CLas).

9. The method of claim 8 wherein 3 to 5 weeks after injection CLas DNA levels dropped 1,100 to 3,100 fold.

10. The method of claim 8 wherein 3 to 5 weeks after injection CLas phage lytic genes of holing, glutathione peroxidase, tail fiber, endolysin and peroxidase decreased.

11. The method of claim 8 wherein 3 to 5 weeks after injection bacterial colonies in the phloem diminished.

12. The method of claim 7 wherein a phloemic migration of the composition is from 1.5-3.25 cm/hr.

13. The method of claim 8 wherein the composition activates phage lytic genes and promotes destruction of CLas bacteria.

14. The method of claim 7 wherein garlic oil is present in an amount of from 40 to 50% by weight; cinnamon oil is present in an amount of from 20 to 30% by weight; *yucca* stem oil is present in an amount of from 3 to 7% by weight; the weights based on a total weight of the composition.

15. The method of claim 7 wherein garlic oil is present in an amount of 45% by weight; cinnamon oil is present in an amount of 25% by weight; *yucca* stem oil is present in an amount of 5% by weight; oleic acid is present in an amount of 15% by weight; hemp seed oil is present in an amount of 9.9% by weight; and dimethyl sulfoxide is present in an amount of 0.1% by weight, the weights based on a total weight of the composition.

16. The method of claim 7 wherein the composition includes allicin, saponins, flavonoids and cinnamaldehyde.

17. The method of claim 16 wherein the composition includes 2,5-Dimethyl-1,3,4-thiadiazole, Diallyl disulfide, Cinnamaldehyde, Diallyl Trisulfide, Allyl Thiopropionate and compound Y having a molecular ion at m/z 147.

18. The method of claim 7 further including colloidal silver.

19. An anti-bacterial composition for plants comprising:
garlic oil is present in an amount of 45% by weight;
cinnamon oil is present in an amount of 25% by weight;
*yucca* stem oil is present in an amount of 5% by weight;
oleic acid is present in an amount of 15% by weight;
hemp seed oil is present in an amount of 9.9% by weight;
and dimethyl sulfoxide is present in an amount of 0.1% by weight, the weights based on a total weight of the composition.

* * * * *